United States Patent
Fukui et al.

(10) Patent No.: US 7,685,628 B2
(45) Date of Patent: Mar. 23, 2010

(54) LICENSE-BASED PATH MANAGEMENT METHOD FOR A COMPUTER SYSTEM

(75) Inventors: Yoshiki Fukui, Yokohama (JP); Tatsundo Aoshima, Yokohama (JP); Takuya Okamoto, Machida (JP); Nobuo Beniyama, Yokohama (JP); Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1153 days.

(21) Appl. No.: 11/286,426

(22) Filed: Nov. 25, 2005

(65) Prior Publication Data

US 2007/0094147 A1 Apr. 26, 2007

(30) Foreign Application Priority Data

Sep. 28, 2005 (JP) .............................. 2005-282203

(51) Int. Cl.
G06F 7/04 (2006.01)

(52) U.S. Cl. .................... 726/2; 726/4; 726/5; 705/59

(58) Field of Classification Search ................ 713/1, 713/2, 188, 194; 380/200, 201, 255, 277; 726/2, 4, 5, 6, 7; 705/59

See application file for complete search history.

(56) References Cited

U.S. PATENT DOCUMENTS

| 6,918,113 | B2 * | 7/2005 | Patel et al. .................. 717/178 |
| 7,272,674 | B1 * | 9/2007 | Nandi et al. .................. 710/38 |
| 2002/0188704 | A1 * | 12/2002 | Gold et al. .................. 709/221 |
| 2005/0021992 | A1 * | 1/2005 | Aida et al. .................. 713/200 |
| 2005/0120176 | A1 | 6/2005 | Maeda et al. |

FOREIGN PATENT DOCUMENTS

JP 2005-165440 6/2005

* cited by examiner

*Primary Examiner*—Kimyen Vu
*Assistant Examiner*—Joseph Pan
(74) *Attorney, Agent, or Firm*—Antonelli, Terry, Stout & Kraus, LLP.

(57) ABSTRACT

An access path management method for a storage network system where a plurality of paths are formed between a data storage system and a host computer which uses the data storage system, an integrated management server monitors port resources constantly. When a port overloads or when a failure occurs in a port, a previously unavailable port is made available and then an access path passing through this port is created to thereby secure a necessary bandwidth. When the load on a port is reduced, an access path that passes through this port is deleted to free a part of the bandwidth, and then the port that is currently in use is invalidated. A license management server for managing how the ports are used, charges by counting in only the length of time during which the port is in use.

17 Claims, 26 Drawing Sheets

| DATA STORAGE SYSTEM INFORMATION /12001 | CHA INFORMATION /12002 | CHA PORT INFORMATION /12003 | UPPER THRESHOLD(%) /12004 | LOWER THRESHOLD(%) /12005 |
|---|---|---|---|---|
| USP1 | CHA1 | P1 | 80 | 35 |
| USP1 | CHA1 | P2 | 80 | 35 |
| USP1 | CHA1 | P3 | 80 | 35 |
| USP1 | CHA1 | P4 | 80 | 35 |
| USP1 | CHA1 | P5 | 70 | 30 |
| USP1 | CHA1 | P6 | 70 | 30 |
| USP2 | CHA1 | P1 | 65 | 20 |
| USP2 | CHA1 | P2 | 65 | 20 |
| USP2 | CHA2 | P1 | 65 | 20 |
| USP2 | CHA2 | P2 | 65 | 20 |

*FIG. 8*

| PATH INFORMATION | HOST INFORMATION | HBA INFORMATION | HBA PORT INFORMATION | MULTIPATH LOGICAL VOLUME INFORMATION | DATA STORAGE SYSTEM INFORMATION | CHA INFORMATION | CHA PORT INFORMATION | LOGICAL VOLUME |
|---|---|---|---|---|---|---|---|---|
| Path1 | Host1 | HBA1 | P1 | HDev1 | USP1 | CHA1 | P1 | LU1 |
| Path2 | Host1 | HBA1 | P2 | HDev1 | USP1 | CHA1 | P1 | LU1 |
| Path3 | Host1 | HBA1 | P3 | HDev1 | USP1 | CHA1 | P2 | LU1 |
| Path4 | Host1 | HBA1 | P1 | HDev1 | USP1 | CHA1 | P3 | LU1 |
| Path5 | Host1 | HBA1 | P2 | HDev1 | USP2 | CHA1 | P3 | LU1 |
| Path6 | Host2 | HBA1 | P1 | HDev1 | USP2 | CHA1 | P1 | LU3 |
| Path7 | Host2 | HBA1 | P2 | HDev2 | USP2 | CHA2 | P2 | LU3 |
| Path8 | Host2 | HBA2 | P1 | HDev2 | USP2 | CHA2 | P1 | LU4 |
| Path9 | Host2 | HBA2 | P2 | HDev2 | USP2 | CHA2 | P2 | LU4 |

FIG. 9

| DATA STORAGE SYSTEM INFORMATION | CHA INFORMATION | CHA PORT INFORMATION | USED RATIO | LAST STATE | LATEST STATE | COPY FLAG |
|---|---|---|---|---|---|---|
| USP1 | CHA1 | P1 | 90 | IN USE | IN USE | ORIGINAL |
| USP1 | CHA1 | P2 | 20 | IN USE | IN USE | ORIGINAL |
| USP1 | CHA1 | P3 | 40 | IN USE | IN USE | P1 |
| USP1 | CHA1 | P4 | 0 | NOT IN USE | NOT IN USE | ORIGINAL |
| USP1 | CHA1 | P5 | 0 | NOT IN USE | NOT IN USE | ORIGINAL |
| USP1 | CHA1 | P6 | 0 | NOT IN USE | NOT IN USE | ORIGINAL |
| USP1 | CHA1 | P1 | 50 | IN USE | IN USE | ORIGINAL |
| USP2 | CHA1 | P2 | 0 | NOT IN USE | NOT IN USE | ORIGINAL |
| USP2 | CHA2 | P1 | 100 | IN FAILURE | IN FAILURE | ORIGINAL |
| USP2 | CHA2 | P2 | 60 | IN USE | IN USE | P1 |

FIG. 10

| DATA STORAGE SYSTEM INFORMATION 32001 | CHA INFORMATION 32002 | CHA PORT INFORMATION 32003 | STATE FLAG 32004 | VALIDATION CAUSE 32005 | VALIDATION START TIME 32006 | ACCUMULATED CHARGE AMOUNT 32007 |
|---|---|---|---|---|---|---|
| USP1 | CHA1 | P1 | VALID | PURCHASED | - | 0 |
| USP1 | CHA1 | P2 | VALID | PURCHASED | - | 0 |
| USP1 | CHA1 | P3 | VALID | OVERLOAD | 2005/1/1 - 14:00 | 1,000,000 |
| USP1 | CHA1 | P4 | INVALID | - | - | 30,000 |
| USP1 | CHA1 | P5 | INVALID | - | - | 20,000 |
| USP1 | CHA1 | P6 | INVALID | - | - | 0 |
| USP2 | CHA1 | P1 | VALID | PURCHASED | - | 0 |
| USP2 | CHA1 | P2 | INVALID | - | - | 0 |
| USP2 | CHA2 | P1 | VALID | PURCHASED | - | 0 |
| USP2 | CHA2 | P2 | VALID | FAILURE | 2004/12/25 - 12:00 | 0 |

| | 330 |
|---|---|
| PER - UNIT CHARGE AMOUNT (YEN / HOUR) | |
| | 100 |

FIG. 12

| DATA STORAGE SYSTEM INFORMATION (90001) | CHA INFORMATION (90002) | CHA PORT INFORMATION (90003) | USED RATIO (90004) | STATE (90005) |
|---|---|---|---|---|
| USP1 | CHA1 | P1 | 90 | IN USE |
| USP1 | CHA1 | P2 | 60 | IN USE |
| USP1 | CHA1 | P3 | 0 | IN FAILURE |
| USP1 | CHA1 | P4 | 0 | NOT IN USE |
| USP1 | CHA1 | P5 | 0 | NOT IN USE |
| USP1 | CHA1 | P6 | 0 | NOT IN USE |

| 33001 | 33002 | 3300 |
|---|---|---|
| VALIDATION CAUSE | PER - UNIT CHARGE AMOUNT (YEN/HOUR) | |
| OVERLOAD | 100 | |
| FAILURE | 0 | |

FIG. 29

| 33011 | 33012 | 33013 | 3301 |
|---|---|---|---|
| VALIDATION CAUSE | PER - UNIT CHARGE AMOUNT (YEN/HOUR) | PAYER | |
| OVERLOAD | 100 | HOST ADMINISTRATOR | |
| FAILURE | 100 | CHA MANUFACTURER | |

FIG. 30

LICENSE-BASED PATH MANAGEMENT METHOD FOR A COMPUTER SYSTEM

CLAIM OF PRIORITY

The present application claims priority from Japanese patent application P2005-282203 filed on Sep. 28, 2005, the content of which is hereby incorporated by reference into this application.

BACKGROUND

This invention relates to a method and apparatus for managing an access path between a host computer and a data storage system. More specifically, this invention relates to access path management in a multipath system where a data storage system is accessed via a plurality of access paths.

The storage capacity of data storage systems run by business organizations and the like is increasing from several reasons including a law that demands long-term storage of data coming into force and data taking a multimedia form. One measure to accommodate the increased storage capacity is to build a SAN (Storage Area Network), with which data sharing, high-speed access, and the like are made possible by connecting a plurality of host computers to disk arrays of a plurality of data storage systems through Fibre Channel or the like.

Placed between the host computers and the data storage systems are a plurality of equipments suitable for SAN connection, such as an HBA port, which is a port of a host computer bus adapter (HBA) connecting the host computers to the SAN, a CHA port, which is a port of a channel adapter (CHA) connecting the data storage systems to the SAN, a Fibre Channel switch, and a hub.

Connecting these equipments between the host computers and the data storage systems creates a plurality of physical paths.

The physical paths created between the host computers and the data storage systems bring path redundancy, which is effective against bandwidth shortage due to overload and such failures as one due to an out-of-order equipment.

The data storage systems each have a storage area composed of a plurality of physical disks. The storage area is partitioned into a plurality of logical volumes, and each of the logical volumes is provided to a specific host computer.

The host computer can choose from the plurality of physical paths laid between the host computer and the data storage systems a route to access the logical volume (hereinafter referred to as access path).

A SAN employs multipath management in which a plurality of access paths are set for one logical volume and the set plurality of access paths are managed.

Multipath management switches access paths when one of the equipments between the host computers and the data storage systems breaks down, thereby enabling the host computers to continue accessing the data storage systems. Multipath management can also balance the access load by using a plurality of access paths concurrently.

Companies that sell SAN-related equipments employ such a sales system for selling an equipment with a limited use of resources at a low price and then selling a right to lift the use limitations (hereinafter referred to as license) to a user who needs more resources of the equipment than initially allowed.

Users can lower the cost of running a SAN by using the minimum amount of equipment resources necessary for normal operation of the SAN and adding more resources as the need arises.

An example of this type of technology is found in JP 2005-165440 A, which discloses a technique of enabling a user to use only an actually necessary number of ports in a data storage system having a plurality of ports.

SUMMARY

In such a computer system, setting a plurality of access paths between a host computer and a logical volume of a disk device reduces the load per access path. It also enables the host computer to access the logical volume of the disk device when a failure occurs along one access path by using another access path.

However, an administrator (user) of the host computer tends to desire to use a minimum number of access paths in order to keep the running cost low in the case where the administrator of the host computer is charged by the amount of resources (CHA ports, for example) of the data storage system that he/she uses.

The administrator of the host computer is also required to go through a purchase procedure for adding resources if lowering of access path QoS or the like necessitates an increase in number of available CHA ports of the data storage system.

This invention has been made in view of the above, and it is therefore an object of this invention to provide an access path management method that needs a minimum number of access paths to keep access path QoS in a computer system having a plurality of access paths.

An embodiment of invention is characterized in that in a method of managing a plurality of access paths in a computer system, the computer system including: a data storage system including a storage area and a plurality of ports; a host computer coupled to the data storage system; an integrated management server for managing a state of the data storage system and a state of the host computer; and a license management server for managing license keys used for making the ports available/unavailable, the plurality of access paths being set between the data storage system and the host computer, whereby the host computer can access the storage area, the method including the steps of: requesting the license management server to issue a license key for validating one of the ports when the access path is set; sending the license key obtained in the requesting step to the data storage system in order to validate an unused port that is currently unavailable among the ports; receiving a notification of a change in an available/unavailable state of the unused port from the data storage system; and creating an access path passing through the unused port that has been made available with the license key upon reception of the notification of the change in the available/unavailable state of the unused port.

According to the embodiment of invention, access path QoS can be maintained with a minimum number of access paths and port resources can be used efficiently.

BRIEF DESCRIPTION OF THE DRAWINGS

The present invention can be appreciated by the description which follows in conjunction with the following figures, wherein:

FIG. 8 is a configuration diagram of a table of threshold information according to the first embodiment;

FIG. 9 is a configuration diagram of a table of path configuration information according to the first embodiment;

FIG. 10 is a configuration diagram of a table of port information according to the first embodiment;

FIG. 11 is a configuration diagram of a table of charging information according to the first embodiment;

FIG. 12 is a configuration diagram of a table of charge amount information according to the first embodiment;

FIG. 13 is a configuration diagram of a table of latest port information according to the first embodiment;

FIG. 29 is a diagram showing an example of a table of charge amount information according to a modified example of the first embodiment; and FIG. 30 is a diagram showing an example of a table of charge amount information according to a modified example of the first embodiment.

DETAILED DESCRIPTION OF THE PREFERRED EMBODIMENT

An embodiment of this invention will be described below with reference to the accompanying drawings.

Figure 1:
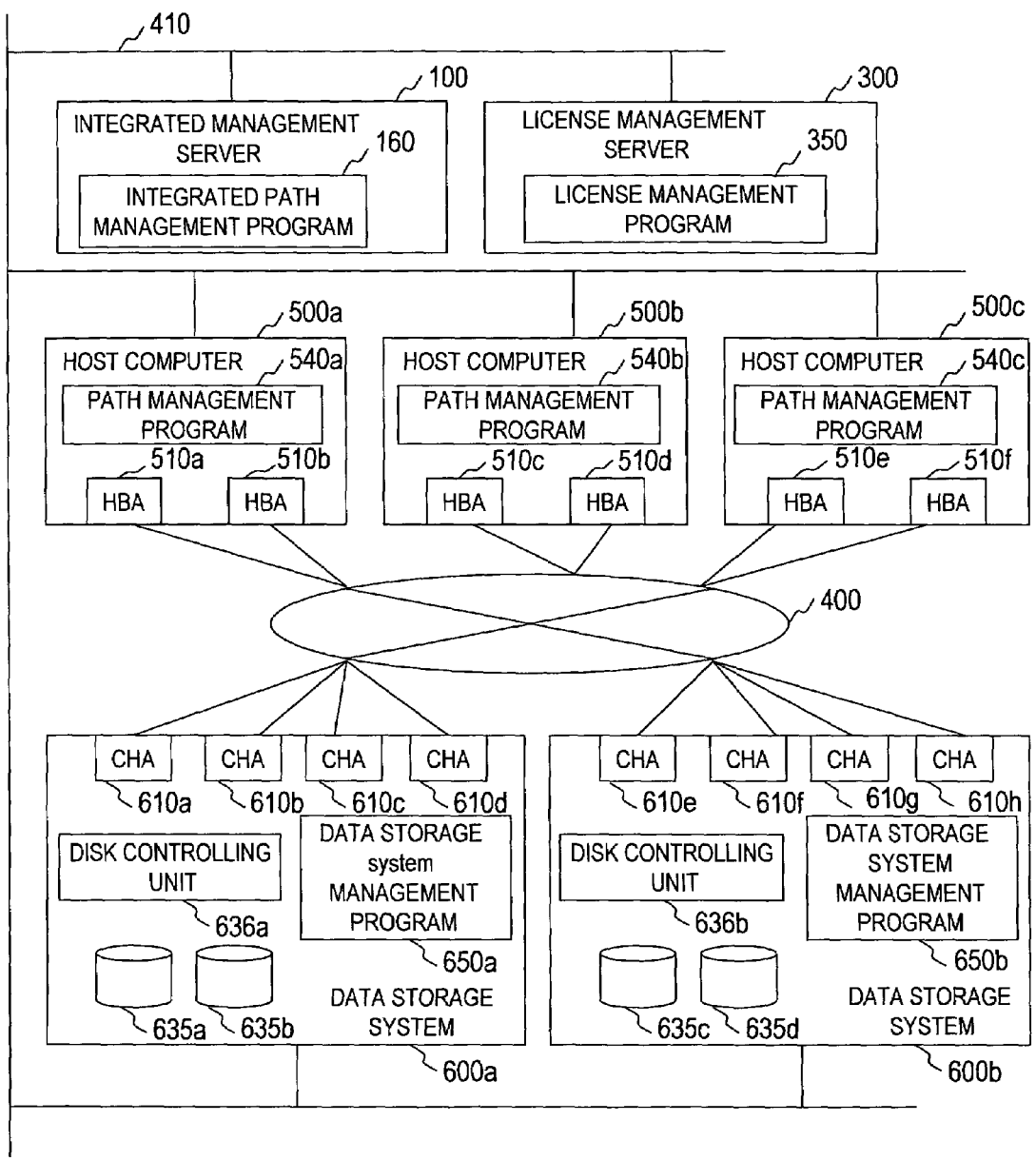
FIG. 1 is a system configuration diagram of a computer system according to a first embodiment.

FIG. 1 is a system configuration diagram showing the configuration of a computer system according to a first embodiment of this invention.

This computer system has an integrated management server 100, a license management server 300, a host computer 500*a*, a host computer 500*b*, a host computer 500*c*, a data storage system 600*a*, and a data storage system 600*b*. In the following description, "host computer 500" will be used to collectively refer to the host computer 500*a*, the host computer 500*b*, and the host computer 500*c*, and "data storage system 600" will be used to collectively refer to the data storage system 600*a* and the data storage system 600*b*.

The host computers 500*a* to 500*c* are connected to the data storage systems 600*a* and 600*b* by a first network 400. The first network 400 is a network suitable for data communications, such as a SAN which follows a Fibre Channel protocol or an IP-SAN which follows a TCP/IP protocol.

The integrated management server 100, the license management server 300, the host computers 500*a* to 500*c* and the data storage systems 600*a* and 600*b* are connected to one another by a second network 410. The second network 410 is a network communications over which are made by a TCP/IP protocol.

When the first network 400 is an IP-SAN, the first network 400 and the second network 410 may together reside in a physically single IP network.

The host computer 500*a*, the host computer 500*b* and the host computer 500*c* have host bus adapters (HBAs) 510*a* to 510*f*, which are network connecting interfaces, and are connected to the first network 400 via the HBAs 510*a* to 510*f*. In the following description, "HBA 510" will be used to collectively refer to the host bus adapters 510*a* to 510*f*.

Figure 4:
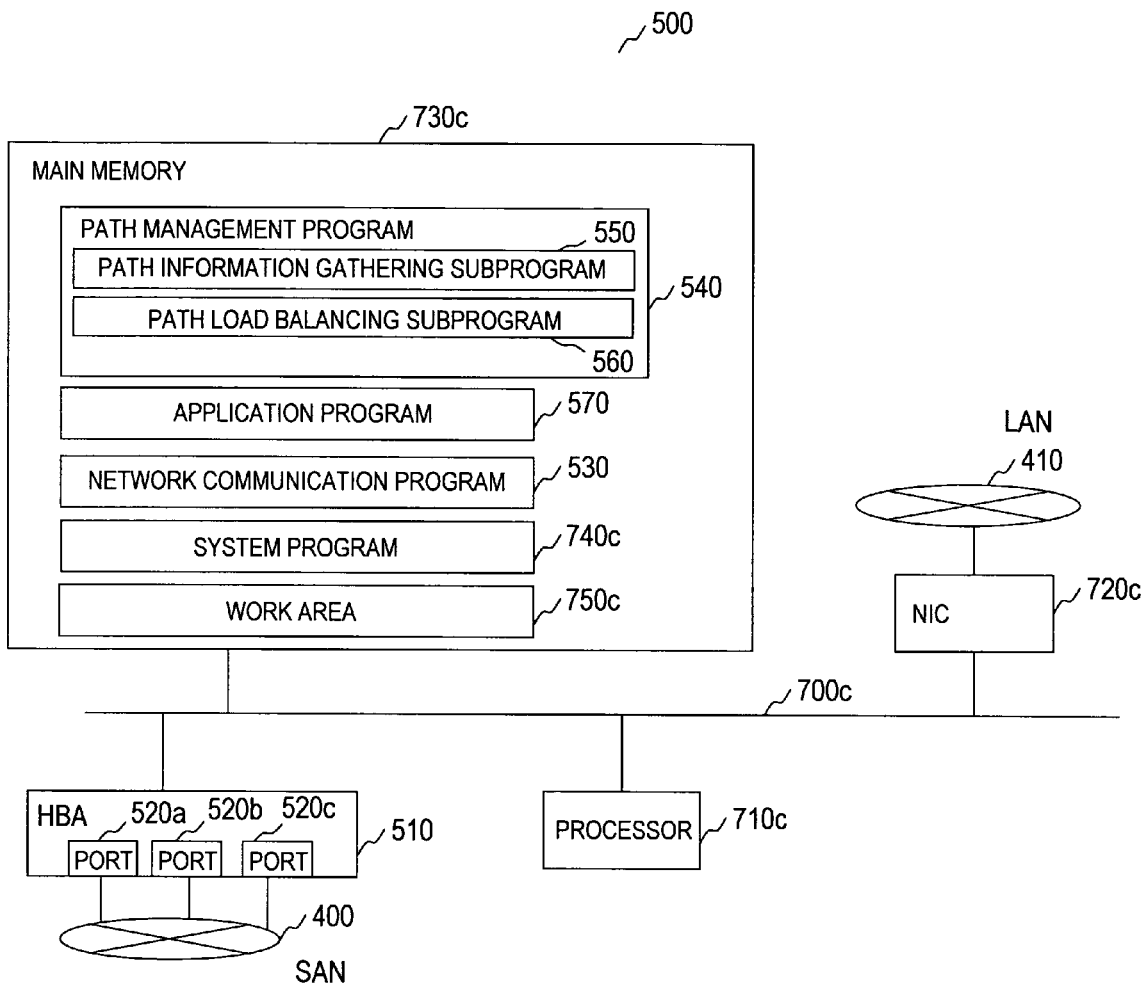
FIG. 4 is a block diagram of a host computer according to the first embodiment.

Specifically, the HBA 510 is, as shown in FIG. 4, equipped with a plurality of HBA ports 520 for connecting to the first network 400. Connecting the HBA ports 520 to the first network 400 connects the host computer 500 to the first network 400.

A path management program 540 of the host computer 500 gathers information about paths, and balances the load by selecting access paths in accordance with the I/O load.

The data storage system 600*a* and the data storage system 600*b* have channel adapters (CHAs) 610*a* to 610*h*, which are network connecting interfaces, and are connected to the first network 400 via the CHAs 610*a* to 610*h*. In the following description, "CHA 610" will be used to collectively refer to the channel adapters 610*a* to 610*h*.

Specifically, the CHA 600 is equipped with a plurality of CHA ports 620 for connecting to the first network 400. Connecting the CHA ports 620 to the first network 400 connects the data storage system 600 to the first network 400.

The data storage system 600 has a logical volume 630, which is a logical access unit.

A data storage system management program 650 of the data storage system 600 performs such processing as monitoring the state of the CHA 610 in the data storage system 600, setting validation and invalidation of the CHA ports 620, and creating and deleting an access path.

A plurality of access paths through which the host computer 500 accesses the logical volume 630 in the data storage system 600 are set between the host computer 500 and the data storage system 600. An access path is a route from one of the HBA ports 520 of the HBA 510 to the logical volume 630 via one of the CHA ports 620 of the CHA 610.

The license management server 300 uses a license management program 350 to manage license keys with which the CHA ports 620 of the data storage system 600 are made available or unavailable.

The integrated management server 100 uses an integrated path-management program 160 to manage the state of the host computer 500 and of the data storage system 600, and orders to execute processing of validating or invalidating the CHA ports 620 of the data storage system 600, processing of validating or invalidating access paths, and other processing.

The port validating or invalidating processing of the CHA ports 620, the access path validating or invalidating processing, and others may be executed when the administrator of this computer system inputs to the integrated management server 100 the number of CHA ports 620 and/or access paths that are necessary.

The operation of this computer system will be outlined below.

The integrated management server 100 executes the integrated path-management program 160 periodically (at predetermined time intervals, for example). Alternatively, the integrated management server 100 executes the integrated path-management program 160 when the path management program 540 of the host computer 500 detects a failure of an access path and notifies the integrated management server 100 of the failure.

The integrated path-management program 160 performs the following processing:

The integrated path-management program 160 first gathers information about the CHA ports 620 from each data storage system 600. From the gathered information, the integrated path-management program 160 detects a failure or overload of an access path. An access path overloads when the used ratio of one of the CHA ports 620 through which the access path passes reaches or exceeds a given threshold. For instance, upon detecting that an access path is overloading or experiencing a failure, the integrated path-management program 160 requests the license management server 300 to issue a license to use one of the CHA ports 620 of the data storage system 600 that are available to the host computer 500.

The license management server 300 receives the request and sends a license for validating one of the CHA ports 620 of the data storage system 600 that are available to the host computer 500, to the integrated management server 100. Upon receiving the license, the integrated path-management program 160 sends the license to the data storage system 600 to request the data storage system 600 to validate this CHA port 620. Based on the received license, the data storage system management program 650 of the data storage system 600 validates the CHA port 620 that is not in use.

The integrated path-management program 160 is notified that the CHA port 620 of the data storage system 600 is now validated, and requests the data storage system management program 650 of the data storage system 600 to validate an access path in order to set an access path from the host computer 500 to the logical volume 630 that is used by the host computer 500. This enables the host computer 500 to access the logical volume 630 via the newly set access path.

Upon recovery from the failure or solution of the overload of the CHA port 620, the newly set access path is invalidated. Specifically, the integrated path-management program 160 detects recovery from the failure or solution of the overload from information about the path. Overload of the CHA ports 620 is solved when the used ratio of the CHA ports 620 becomes equal to or lower than a given threshold.

Upon detecting recovery from the failure or solution of the overload, the integrated path-management program 160 requests the data storage system management program 650 to invalidate an access path using one of the CHA ports 620 that is to be invalidated. The data storage system management program 650 notifies the integrated path-management program 160 of completion of invalidating this path.

After notified of the invalidation completion, the integrated path-management program 160 requests the license management server 300 to issue a license to invalidate the one of the CHA ports 620 of the data storage system 600 that is to be invalidated.

The license management server 300 receives the request and sends a license for invalidating the CHA port 620 of the data storage system that is currently used by the host computer 500 to the integrated management server 100. The integrated path-management program 160 sends the license to the data storage system 600 and requests the data storage system 600 to invalidate this CHA port 620.

The data storage system management program 650 invalidates the CHA port 620 based on the received license, and notifies the integrated management server 100 of the fact that the CHA port 620 is now invalidated.

In this manner, the license management server 300 manages licenses for validating and invalidating the CHA ports 620. The license management server 300 also manages how much users of the CHA ports 620 are charged in accordance with their frequency of use of the ports (e.g., utilization time of the ports). The license management server 300 may manage fees sorted by the type of cause that propels users to use the CHA ports 620. This makes it possible to, when, for instance, a failure in the data storage system 600a necessitates addition of new CHA ports 620, charge the administrator of the data storage system 600a. In another example where overload in the host computer 500a necessitates addition of new ports, this makes it possible to charge the administrator of the host computer 500a.

Furthermore, the license management server 300 may manage fees sorted by the cause of failure, which can be classified into failure in the data storage system 600, network failure, and failure in a port of the host computer 500. This makes it possible to charge the administrator of the data storage system 600, the administrator of the host computer 500, and the administrators of the networks.

Next, the configuration of each component of this computer system will be described in detail.

Figure 2:
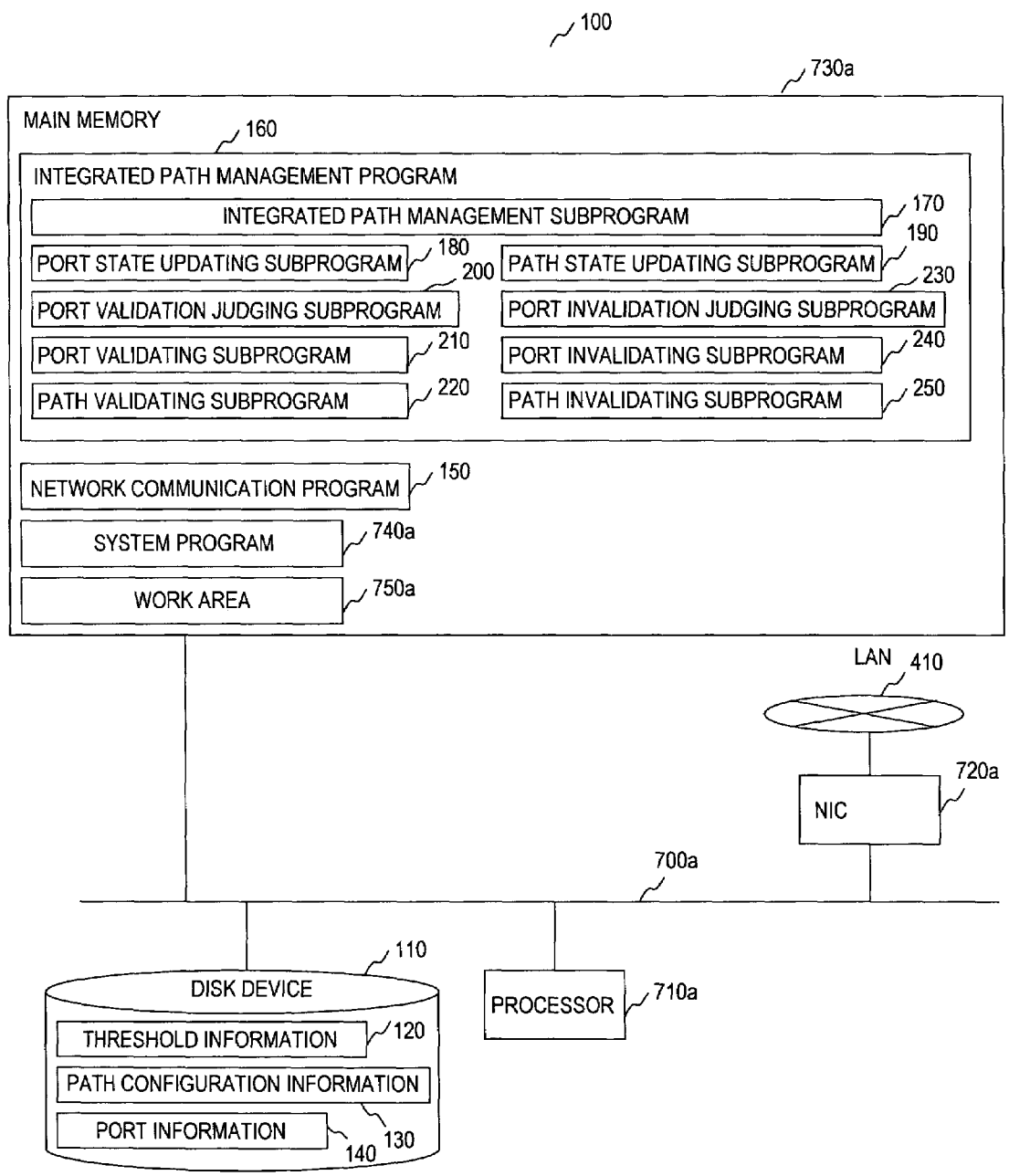
FIG. 2 is a block diagram of an integrated management server according to the first embodiment.

FIG. 2 is a block diagram showing an example of the configuration of the integrated management server 100 according to the first embodiment.

The integrated management server 100 has a processor 710a, a main memory 730a, a network interface (NIC) 720a, and a disk device 110.

The processor 710a, the NIC 720a, the main memory 730a, and the disk device 110 are connected to one another by a system bus 700a.

The NIC 720a is an interface for communicating, via the second network 410, with components connected to the integrated management server 100.

The disk device 110 stores threshold information 120, path configuration information 130, and port information 140, which will be described later.

The main memory 730a stores the integrated path-management program 160, a network communication program 150, and a system program 740a, which are usually stored in a non-volatile storage medium (for example, the disk device 110). These programs are transferred from the disk device 110 to the main memory 730a and executed as the need arises by the processor 710a.

A part of the main memory 730a is set aside as a work area 750a, which is used to store temporarily needed data in executing the programs.

The integrated path-management program 160 includes an integrated path-management subprogram 170, a port state updating subprogram 180, a path state updating subprogram 190, a port validation judging subprogram 200, a port validating subprogram 210, a path validating subprogram 220, a port invalidation judging subprogram 230, a port invalidating subprogram 240, and a path invalidating subprogram 250.

The port state updating subprogram 180 gathers information on the used ratio of the bandwidth of the CHA ports 620 and information on the state of the CHA ports 620. The port state updating subprogram 180 updates the port information 140 based on the gathered information, and executes port state updating processing in which the updated port information 140 is stored in the disk device 110.

The path state updating subprogram 190 gathers information on the state of access paths between the host computer 500 and the data storage system 600. The path state updating subprogram 190 updates the path configuration information 130 based on the gathered information, and executes path state updating processing in which the updated path configuration information 130 is stored in the disk device 110.

The port validation judging subprogram 200 executes port validation judging processing in which whether it is necessary to make additional CHA ports 620 available or not is judged from at least one of the used ratio of the bandwidth of the CHA ports 620 and the state of the CHA ports 620.

The port validating subprogram 210 executes port validating processing in which the CHA ports 620 that are currently unavailable are validated and thus made available.

The path validating subprogram 220 executes path validating processing for creating new access paths that pass through the CHA ports 620 that have been made available by the processing of the port validating subprogram 210.

The port invalidation judging subprogram 230 executes port invalidation judging processing in which whether it is necessary to turn currently available CHA ports 620 unavailable or not is judged from at least one of the used ratio of the bandwidth of the CHA ports 620 and the state of the CHA ports 620.

The port invalidating subprogram 240 executes port invalidating processing in which currently available CHA ports 620 are invalidated and thus made unavailable.

The path invalidating subprogram 250 executes path invalidating processing for deleting access paths that pass through the CHA ports 620 to be invalidated.

The integrated path-management subprogram 170 controls the port state updating subprogram 180, the path state updating subprogram 190, the port validation judging subprogram 200, the port validating subprogram 210, the path validating subprogram 220, the port invalidation judging subprogram 230, the port invalidating subprogram 240, and the path invalidating subprogram 250 to execute processing of these programs in order.

The system program 740a provides basic processing functions for executing various programs including the integrated path-management program 160, for example, a function of inputting/outputting data with an external device coupled to the integrated management server 100.

The network communication program 150 is a program that enables the integrated management server 100 to communicate with other components of the computer system via the second network 410.

The processor 710a executes various programs stored in the main memory 730a.

The NIC 720a controls network communications requested by the network communication program 150 to communicate with an external device coupled to the integrated management server 100.

Figure 3:
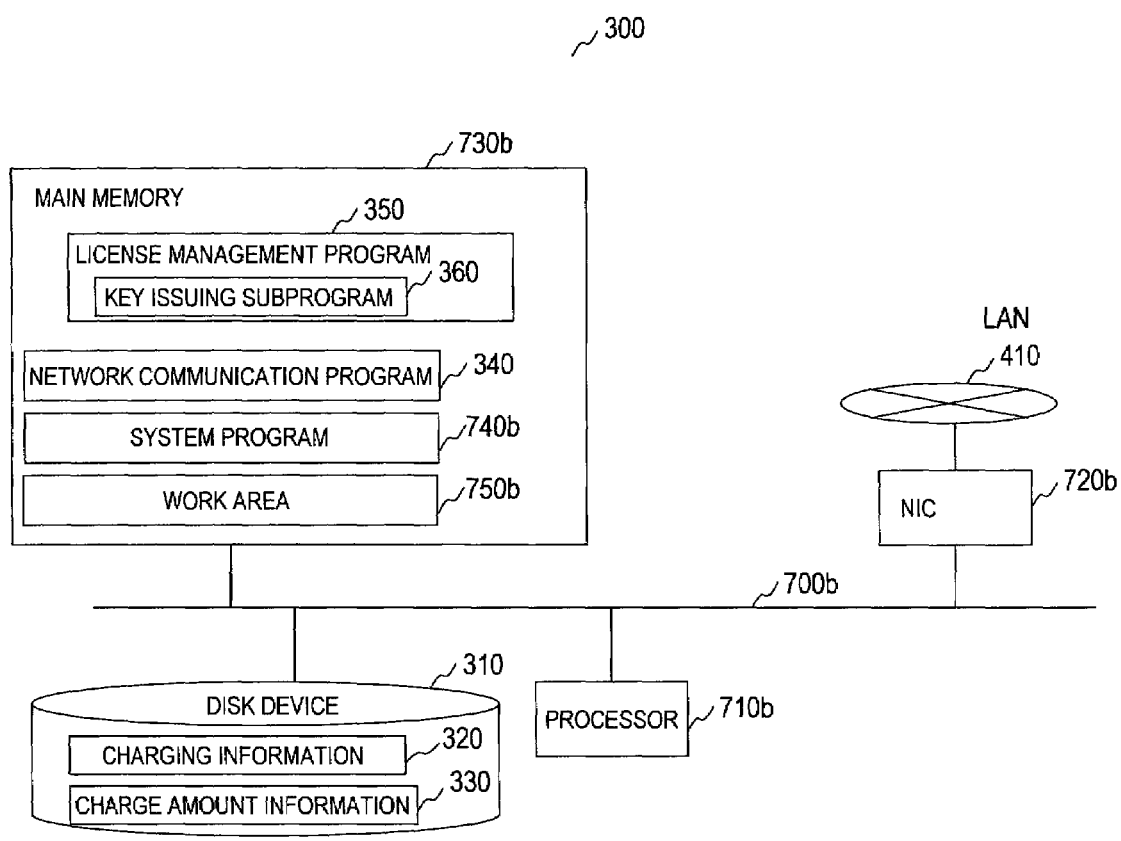
FIG. 3 is a block diagram of a license management server according to the first embodiment.

FIG. 3 is a block diagram showing an example of the configuration of the license management server 300 according to the first embodiment.

The license management server 300 has a disk device 310, a processor 710b, a network interface (NIC) 720b, and a main memory 730b.

The processor 710b, the NIC 720b, the main memory 730b, and the disk device 310 are connected to one another by a system bus 700b.

The NIC 720b is an interface that communicates, via the second network 410, with components connected to the license management server 300.

The disk device 310 stores charging information 320 and charge amount information 330, which will be described later.

The main memory 730b stores the license management program 350, a network communication program 340, and a system program 740b, which are usually stored in a non-volatile storage medium (for example, the disk device 310). These programs are transferred from the disk device 310 to the main memory 730b and executed as the need arises by the processor 710b.

A part of the main memory 730b is set aside as a work area 750b, which is used to store temporarily needed data in executing the programs.

The license management program 350 includes a key issuing subprogram 360. The key issuing subprogram 360 executes key issuing processing for management of license keys with which the CHA ports 620 are make available or unavailable and management of fees charged in accordance with how much users use the CHA ports 620.

The system program 740b provides basic processing functions for executing various programs including the license management program 350, for example, a function of exchanging data with an external device coupled to the license management server 300.

The network communication program 340 is a program that enables the license management server 300 to communicate with other components of the computer system via the second network 410.

The processor 710b executes various programs stored in the main memory 730b.

The NIC 720b controls network communications requested by the network communication program 340 to communicate with an external device coupled to the license management server 300.

FIG. 4 is a block diagram showing an example of the configuration of the host computer 500 according to the first embodiment. The host computer 500a, the host computer 500b, and the host computer 500c have the same configuration.

The host computer 500 has a processor 710c, a network interface (NIC) 720c, a main memory 730c, and the HBA 510.

The host computer 500 is connected to the first network 400 via a network connecting interfaces (the HBA 510). The HBA 510 has a plurality of HBA ports 520 to connect with the first network 400.

The main memory 730c stores the path management program 540, an application program 570, a network communication program 530, and a system program 740c, which are usually stored in a non-volatile storage medium (for example, a disk device that is omitted from the drawing). These programs are transferred from the not-shown disk device to the main memory 730c and executed as the need arises by the processor 710c.

A part of the main memory 730c is set aside as a work area 750c, which is used to store temporarily needed data in executing the programs.

The path management program 540 provides a multipath logical volume, which will be described later.

The path management program 540 includes a path information gathering subprogram 550 and a path load balancing subprogram 560.

The path information gathering subprogram 550 executes path information gathering processing to collect information that makes up an access path between the host computer 500 and the data storage system 600, and creates the path configuration information 130.

The path load balancing subprogram 560 manages a plurality of access paths, namely, multi-access paths, between the host computer 500 and the data storage system 600, and controls switching of multi-access paths. When a failure occurs along one access path, the path load balancing subprogram 560 executes path load balancing processing to switch to an access path that is not experiencing a failure.

The application program 570 requests data input/output (I/O request) to/from the data storage system 600.

For an I/O request issued by the application program 570, the path load balancing subprogram 560 chooses one of the HBA ports 520 where the load is small. The I/O request is sent to the data storage system 600 via the chosen HBA port 520.

The system program 740c provides basic processing functions for executing various programs, for example, a function of exchanging data with an external device coupled to the host computer 500.

The network communication program 530 is a program that enables the host computer 500 to communicate with an external device coupled to the host computer 500 via the second network 410.

The processor 710c executes various programs stored in the main memory 730c.

The NIC 720c controls network communications requested by the network communication program 530 to communicate with an external device coupled to the host computer 500.

Figure 5:
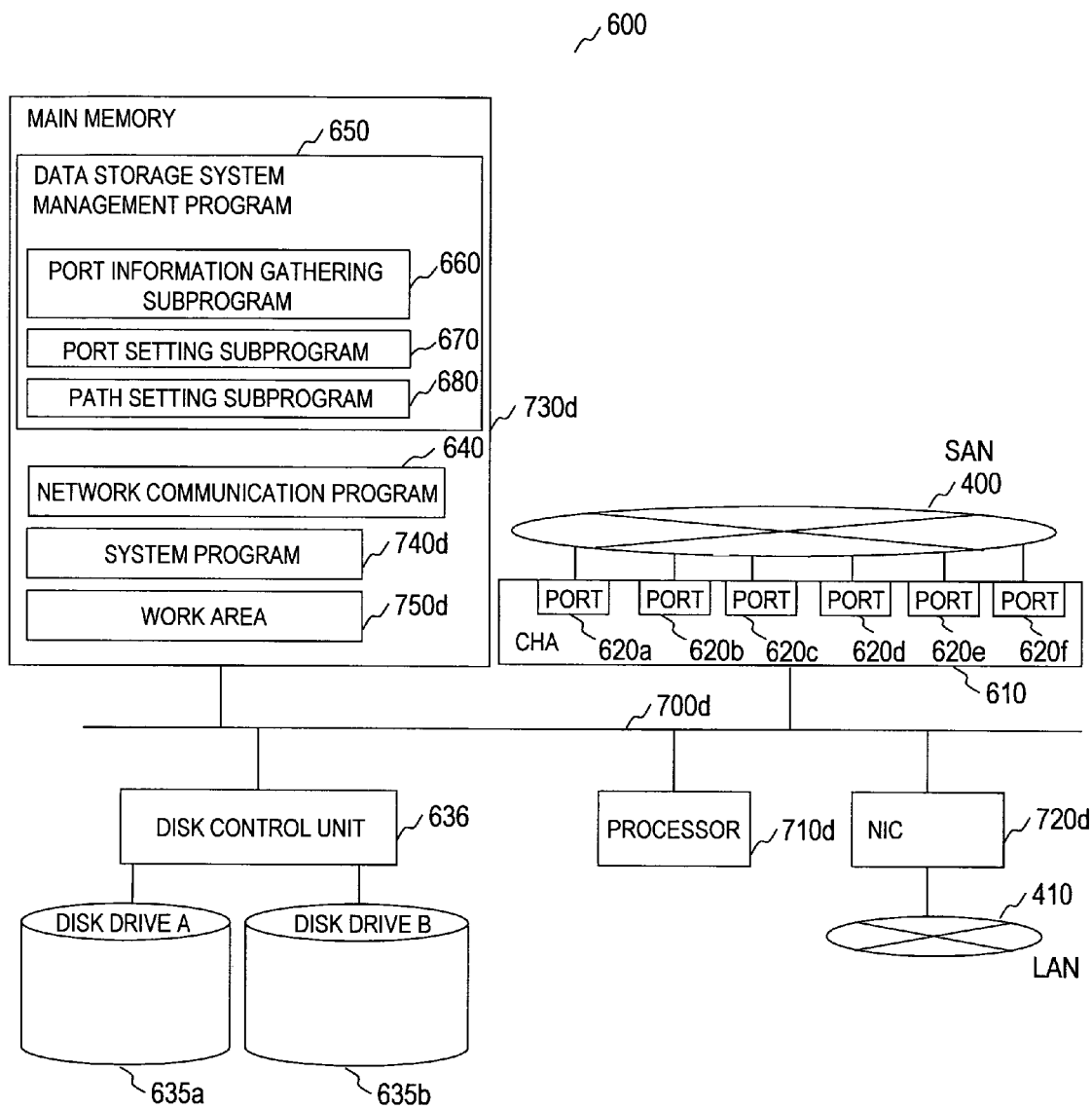
FIG. 5 is a block diagram of a data storage system according to the first embodiment.

FIG. 5 is a block diagram showing an example of the configuration of the data storage system 600 according to the first embodiment. The data storage system 600a and the data storage system 600b have the same configuration.

The data storage system 600 has a processor 710d, a network interface (NIC) 720d, a main memory 730d, disk drives 635a and 635b, a disk control unit 636, and the CHA 610.

The processor 710d, the network interface (NIC) 720d, the main memory 730d, the disk drives 635a and 635b, the disk control unit 636, and the CHA 610 are connected to one another via a system bus 700d.

The data storage system 600 is connected to the first network 400 via a network connecting interfaces (the CHA 610). The CHA 610 has a plurality of CHA ports 620 to connect with the first network 400.

The data storage system 600 has disk drives 635 (the disk drive A 635a, the disk drive B 635b . . . ), and provides the logical volume 630 where data is stored.

The disk control unit 636 is responsible for overall management of disk drives. Specifically, the disk control unit 636 controls a RAID group constituted of the disk drives 635. The disk control unit 636 also controls data write in the logical volume 630 of the disk drives 635 or data read out of the logical volume 630 of the disk drives 635 in accordance with an I/O request made by the CHA ports 620.

The logical volume 630 is a logical unit of access from the host computer 500. The logical volume 630 is formed by dividing a RAID group, which is constituted of the disk drives 635, into areas of given size.

The main memory 730d stores the data storage system management program 650, the network communication program 640, and a system program 740d, which are usually stored in a non-volatile storage medium (for example, a non-volatile memory omitted from the drawing). These programs are transferred from the not-shown, non-volatile memory to the main memory 730d and executed as the need arises by the processor 710d.

A part of the main memory 730d is set aside as a work area 750d, which is used to store temporarily needed data in executing the programs.

The data storage system management program 650 includes a port information gathering subprogram 660, a port setting subprogram 670, and a path setting subprogram 680.

The port information gathering subprogram 660 executes port information gathering processing for gathering information on the CHA ports 620 such as the ports' used ratio and state.

The port setting subprogram 670 executes port setting processing to control validation and invalidation of the CHA ports 620 in accordance with license keys.

The path setting subprogram 680 executes path setting processing to control setting up and removal of routes to the logical volume 630 from the CHA ports 620 which constitute a part of access paths.

The system program 740d provides basic processing functions for executing various programs, for example, a function of exchanging data with an external device coupled to the data storage system 600.

The network communication program 640 is a program that enables the data storage system 600 to communicate with an external device coupled to the data storage system 600 via the second network 410.

The processor 710d executes various programs stored in the main memory 730d.

The NIC 720d controls network communications requested by the network communication program 640 to communicate with an external device coupled to the data storage system 600.

Figure 6:
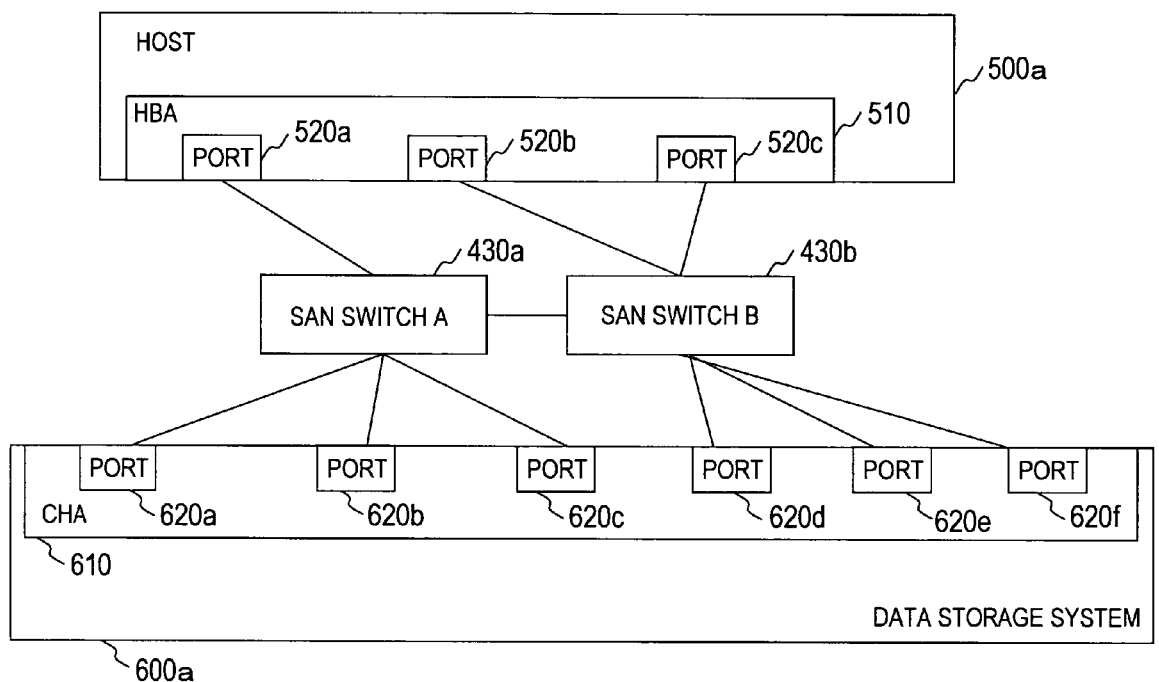
FIG. 6 is an explanatory diagram showing a physical path configuration according to the first embodiment.

FIG. 6 is a system configuration diagram showing an example of the configuration of the computer system according to the first embodiment of this invention when the first network 400 is a SAN.

Ports of a SAN switch A 430a and of a SAN switch B 430b are connected to the host computer 500a via the HBA ports 520 of the HBA 510, and to the data storage system 600a via the CHA ports 620 of the CHA 610.

From the HBA ports 520, here the HBA port 520a, the HBA port 520b, and the HBA port 520c, a plurality of physical paths are formed to reach the CHA ports 620, here, the CHA port 620a, the CHA port 620b, the CHA port 620c, the CHA port 620d, the CHA port 620e, and the CHA port 620f, via the SAN switch A 430a and the SAN switch B 430b. A physical path is formed also between the SAN switch A 430a and the SAN switch B 430b.

FIG. 6 shows one host computer, 500a, and one data storage system, 600a, but the configuration of FIG. 6 is also applicable to a case where the computer system has a plurality of host computers 500 and a plurality of data storage systems 600.

Figure 7:
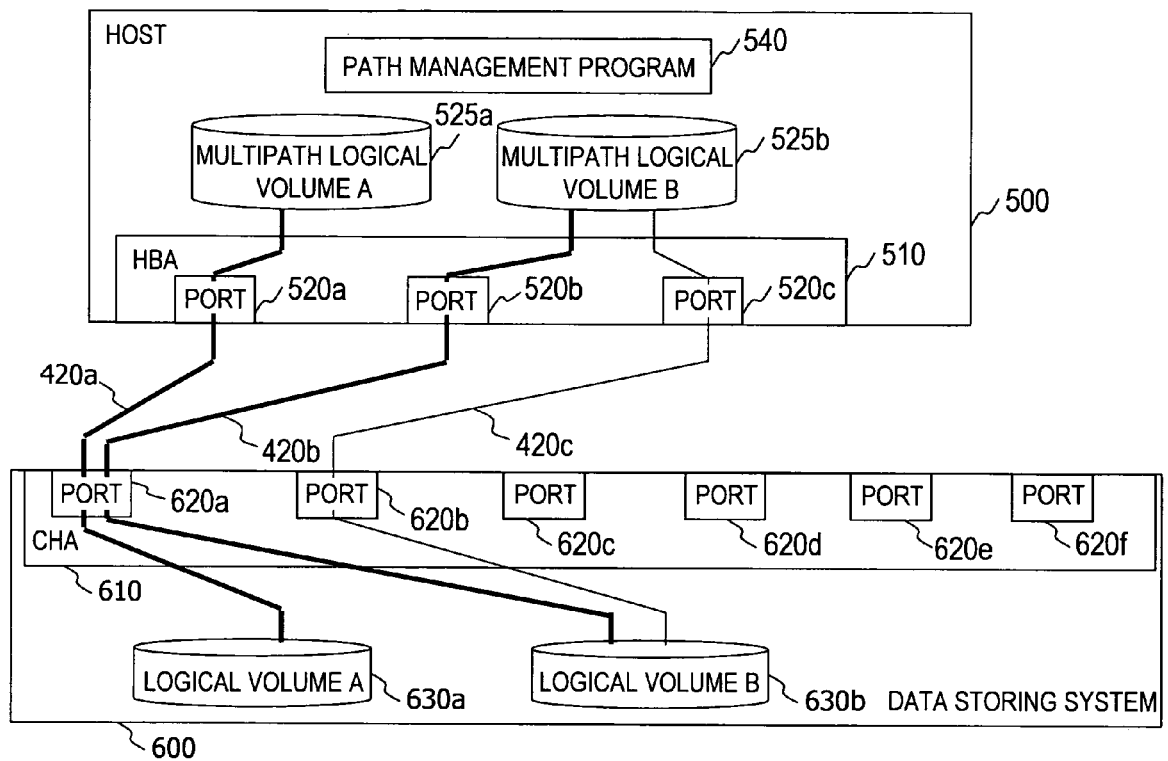
FIG. 7 is an explanatory diagram showing an access path configuration according to the first embodiment.

FIG. 7 is a diagram showing an example of access paths in the computer system of FIG. 1. Physical paths, which are unnecessary for the description here, are omitted from FIG. 7 and logical access paths alone are shown in FIG. 7.

An access path is a logical route set on chosen one of a plurality of physical paths present between the host computer 500 and the data storage system 600.

An access path is also defined as a logical route that passes through at least three points, the HBA port 520, the CHA port 620, and the logical volume 630.

The data storage system 600 sets an access path by having the path setting subprogram 680 execute the path setting processing.

A method of setting an access path is described below.

First, a specific logical volume 630 is allocated to a specific CHA port 620 of the data storage system 600 to create an access path on the side of the data storage system 600. The access path on the side of the data storage system 600 is a portion of a whole access path.

The access path on the side of the data storage system 600 is open only to a specific HBA port 520. In other words, allocation between one CHA port 620 and one logical volume 630 is set such that this logical volume 630 can be accessed via this CHA port 620 only from a specifically chosen HBA port 520.

The access path on the side of the data storage system 600 is open only to a specific HBA port 520. In other words, allocation between one CHA port 620 and one logical volume 630 is set such that this logical volume 630 can be accessed via this CHA port 530 only from a specifically chosen HBA port 520.

In the example shown in FIG. 7, a logical volume A 630a is allocated to a CHA port 620a. The allocation between the logical volume A 630a and the CHA port 620a is set such that the logical volume A 630a can be accessed via the CHA port 620a only from the HBA port 520a.

A logical volume B 630b is allocated to the CHA port 620a and the CHA port 620b. The allocation between the logical volume B 630b and the CHA port 620a is set such that the logical volume B 630b can be accessed via the CHA port 620a only from the HBA port 520b. The allocation between the logical volume B 630b and the CHA port 620b is set such that the logical volume B 630b can be accessed via the CHA port 620b only from the HBA port 520c.

Created as a result are an access path 420a leading to the logical volume 630a via the CHA port 620a and the HBA port 520a, an access path 420b leading to the logical volume 630b via the CHA port 620a and the HBA port 520b, and an access path 420c leading to the logical volume 630b via the CHA port 620b and the HBA port 520c.

The path management program 540 provides a multipath logical volume 525.

The multipath logical volume 525 makes it look like the logical volume 630 in the data storage system 600 is located in the host computer 500.

The multipath logical volume 525 also makes it seem like there is only one logical volume 630 on the host computer 500 when a plurality of access paths lead to one logical volume 630, which otherwise causes as many logical volumes 630 as the number of access paths connected to the logical volume 630 to appear on the host computer 500.

In the example shown in FIG. 7, one access path, 420a, is connected to the logical volume A 630a and a multipath logical volume A 525a makes it seem like the logical volume A 630a is located in the host computer 500.

To the logical volume B 630b, two access paths, 420b and 420c, are connected and a multipath logical volume B 525b makes it seem like only one logical volume B is on the host computer 500.

There are two access paths 420b and 420c between the logical volume B 630b and the multipath logical volume 525b, and the path load balancing subprogram 560 of the path management program 540 balances the load to access the logical volume B 630b by alternately allocating data I/O to and from the logical volume B 630b to the two access paths through a load balancing algorithm such as round robin.

A plurality of physical paths are secured for redundancy for the CHA ports 620 of the data storage system 600. The CHA ports 620 that are not part of any access paths at present, here, the CHA ports 620c, 620d, 620e, and 620f, are kept in an unavailable state.

The CHA ports 620c, 620d, 620e, and 620f which are currently unavailable and not in use serve as auxiliary ports for when the CHA ports 620a and 620b which are available and part of access paths at present overload, suffer a failure, or are otherwise incapacitated. The unavailable CHA ports 620c, 620d, 620e, and 620f are connected to the HBA ports 520a, 520b, and 520c in advance, to thereby form physical paths for redundancy.

To form physical paths, all ports between the host computer 500 and the data storage system 600 are connected to one another in advance as in the example shown in FIG. 6.

FIG. 8 is a diagram showing an example of the configuration of a table of the threshold information 120 according to the first embodiment.

The threshold information 120 is kept in the disk device 110 of the integrated management server 100.

The threshold information 120 includes data storage system information 12001, CHA information 12002, CHA port information 12003, an upper threshold 12004, and a lower threshold 12005.

The data storage system information 12001 is a unique identifier for identifying the data storage system 600. The CHA information 12002 is a unique identifier for identifying the CHA 610. The CHA port information 12003 is a unique identifier for identifying the CHA port 620.

The upper threshold 12004 indicates a preset value that is compared against the used ratio of the CHA port 620 so that the port validation judging subprogram 180 can judge whether the port is overloaded or not. The upper threshold 12004 can be changed by the administrator of the integrated management server 100.

The lower threshold 12005 indicates a preset value that is compared against the used ratio of the CHA port 620 so that the port invalidation judging subprogram 230 can judge whether the port is lightly loaded or not. The lower threshold 12005 can be changed by the administrator of the integrated management server 100.

In the first embodiment, the upper threshold 12004 and the lower threshold 12005 are expressed by the used bandwidth ratio (%), which is the ratio of how much of the maximum usable bandwidth of the CHA port 620 is consumed. Alternatively, the amount of data (mega bit/second (Mbps)) transferred through the CHA port 620 may be employed for the upper threshold 12004 and the lower threshold 12005.

In the case where a plurality of host computers 500 share one CHA port 620, the threshold information 120 may be set individually for each of the plurality of host computers 500.

FIG. 9 is a diagram showing an example of the configuration of a table of the path configuration information 130 according to the first embodiment.

The path configuration information 130 is kept in the disk device 110 of the integrated management server 100.

The path configuration information 130 includes path information 13001, host information 13002, HBA information 13003, HBA port information 13004, multipath logical volume information 13005, data storage system information 13006, CHA information 13007, CHA port information 13008, and logical volume information 13009.

The path information 13001 is a unique identifier for identifying an access path. The host information 13002 is a unique identifier for identifying the host computer 500. The HBA information 13003 is a unique identifier for identifying the HBA 510.

The HBA port information 13004 is a unique identifier for identifying the HBA port 520. The multipath logical volume information 13005 is a unique identifier for identifying the multipath logical volume 525. The data storage system information 13006 is a unique identifier for identifying the data storage system 600.

The CHA information 13007 is a unique identifier for identifying the CHA 610. The CHA port information 13008 is a unique identifier for identifying the CHA port 620. The logical volume information 13009 is a unique identifier for identifying the logical volume 635.

The path configuration information 130 is information for identifying the configuration of an access path. The path configuration information 130 is created through the path information gathering processing executed by the path information gathering subprogram 550 upon reception of requests periodically made through the path state updating processing, which is executed by the path state updating subprogram 190.

FIG. 10 is a diagram showing an example of the configuration of a table of the port information 140 according to the first embodiment.

The port information 140 is kept in the disk device 110 of the integrated management server 100.

The port information 140 includes data storage system information 14001, CHA information 14002, CHA port information 14003, a used ratio 14004, a last state 14005, a latest state 14006, and a copy flag 14007.

The data storage system information 14001 is a unique identifier for identifying the data storage system 600. The CHA information 14002 is a unique identifier for identifying the CHA 610. The CHA port information 14003 is a unique identifier for identifying the CHA port 620.

The used ratio 14004 is information indicating how much of the bandwidth of the CHA port 620 is consumed, and is expressed by the used bandwidth ratio of the CHA port 620.

The last state 14005 is information indicating which of the three states "in use", "not in use", and "in failure" the CHA port 620 is in the last time. The latest state 14006 is information indicating which of the three states "in use", "not in use", and "in failure" the latest state of the CHA port 620 is.

The copy flag 14007 is a flag indicating whether the CHA port 620 is a copy port or an original port. In the case where the CHA port 620 is a copy port, values for identifying the original port from which the copy port is copied, namely, the data storage system information 14001, CHA information 14002, and CHA port information 14003 of the original port, are kept as the copy flag 14007.

The port information 140 is created through the port information gathering processing executed by the port information gathering subprogram 660 upon reception of requests periodically made through the port state updating processing, which is executed by the port state updating subprogram 180 of the integrated path-management program 160.

FIG. 11 is a diagram showing an example of the configuration of a table of the charging information 320 according to the first embodiment.

The charging information 320 is kept in the disk device 310 of the license management server 300.

The charging information 320 includes data storage system information 32001, CHA information 32002, CHA port information 32003, a state flag 32004, a validation cause 32005, a validation start time 32006, and an accumulated charge amount 32007.

The data storage system information 32001 is a unique identifier for identifying the data storage system 600. The CHA information 32002 is a unique identifier for identifying the CHA 610. The CHA port information 32003 is a unique identifier for identifying the CHA port 620. The data storage system information 32001, the CHA information 32002, and the CHA port information 32003 are information used to specify the CHA port 620.

The state flag 32004 indicates the state of the CHA port 620, the "state" here being valid (available) or invalid (unavailable).

The validation cause 32005 is information indicating why the CHA port 620 that is currently valid (available) has been validated. Specifically, the validation cause 32005 indicates whether the CHA port 620 has been purchased, is overloading, or experiencing a failure. The validation start time 32006 is information indicating the time when the CHA port 620 is validated. The year, month, date, and time at which validation is started are entered as the validation start time 32006.

The accumulated charge amount 32007 is information indicating the amount of charge accumulated from the first time to the last time.

The charging information 320 is managed through the key issuing processing, which is executed by the license management program 350 of the license management server 300.

FIG. 12 is a diagram showing an example of the configuration of a table of the charge amount information 330 according to the first embodiment.

The charge amount information 330 includes a per-unit charge amount, is set in advance by the administrator, and is kept in the disk device 310. The per-unit charge amount shows how much is charged hourly for the use of the CHA port 620.

The charge amount information 330, which in the first embodiment sets an hourly charge amount, may set an arbitrary amount charged by the unit of an arbitrary length of time.

Different per-unit charge amounts may be set to different CHA ports 620.

FIG. 13 is a diagram showing an example of the configuration of a table of latest port information 900 according to the first embodiment.

The latest port information 900 is information for updating the used ratio 14004 and the latest state 14006 in the port information 140 of FIG. 10 with the latest data. Once updated with the latest port information 900, the port information 140 is stored in the disk device 110 of the integrated management server 100.

The latest port information 900 includes data storage system information 90001, CHA information 90002, CHA port information 90003, a used ratio 90004, and a state 90005.

The data storage system information 90001 is a unique identifier for identifying the data storage system 600. The CHA information 90002 is a unique identifier for identifying the CHA 610. The CHA port information 90003 is a unique identifier for identifying the CHA port 620. The data storage system information 90001, the CHA information 90002, and the CHA port information 90003 are information used to specify the CHA port 620.

The used ratio 90004 is information indicating the latest load of the CHA port 620, and is expressed by how much of the bandwidth of the CHA port 620 is consumed. The state 90005 is information indicating which of the three states, "in use", "not in use", and "in failure", the latest state of the CHA port 620 is.

Figure 14:
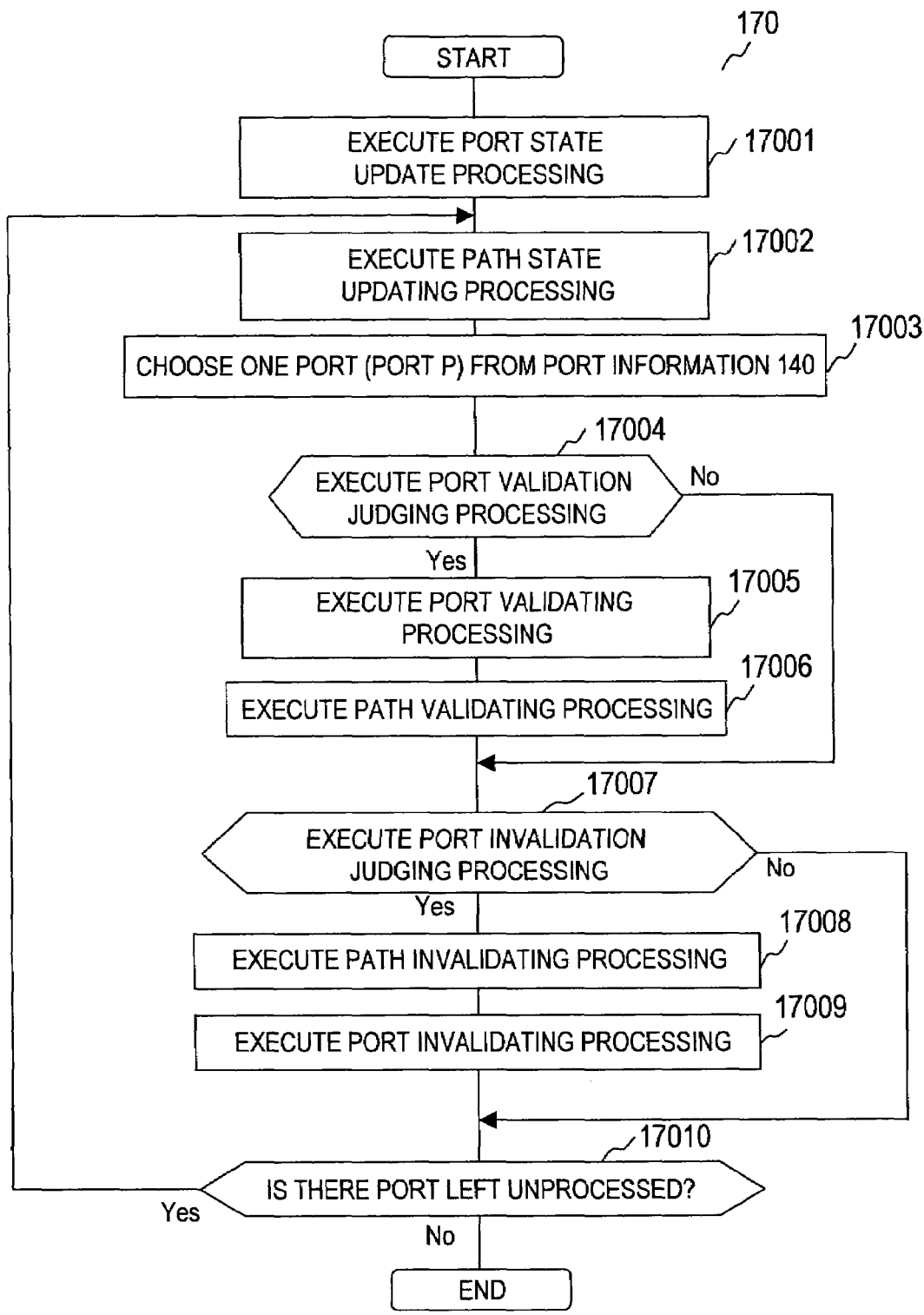
FIG. 14 is a flow chart for integrated path-management processing according to the first embodiment.

FIG. 14 is a flow chart for integrated path-management processing executed by the integrated path-management subprogram 170 according to the first embodiment.

The integrated path-management processing according to the first embodiment will be described first with reference to FIG. 14. Thereafter, a detailed description will be given on each characteristic processing that makes up the integrated path-management processing with reference to FIGS. 15 to 27.

The integrated management server 100 executes the integrated path-management subprogram 170 periodically (e.g., for every 10 minutes). The integrated management server 100 may execute the integrated path-management subprogram 170 when receiving a request for an additional access path bandwidth from the host computer 500 that detects a failure or overload of an access path.

The integrated path-management subprogram 170 first gathers information on the used ratio of the CHA ports 620 and information on the state of the CHA ports 620 in order to have the port state updating subprogram 180 update the port information 140 with the latest data. Then the port state updating processing is executed to update the port information 140 based on the gathered information (17001).

The integrated path-management subprogram 170 next gathers information on the state of access paths between the host computer 500 and the data storage system 600 with the use of the path state updating subprogram 190 in order to update the path configuration information 130 to the latest state. Then the path state updating processing is executed to update the path configuration information 130 based on the gathered information (17002).

The integrated path-management subprogram 170 chooses one CHA port 620 that is specified by the data storage system information 14001, the CHA information 14002, and the CHA port information 14003 in the port information 140 updated through the port state updating processing in the step 17001 (the chosen CHA port is hereinafter referred to as "CHA port P"). From an entry of the chosen CHA port P in the port information 140, the data storage system information 14001, the CHA information 14002, the CHA port information 14003, the used ratio 14004, the last state 14005, the latest state 14006, and the copy flag 14007 are extracted and stored in the work area 750a, which is secured in the main memory 730a of the integrated management server 100 (17003).

Next, the integrated path-management subprogram 170 has the port validation judging subprogram 200 execute the port validation judging processing to judge whether it is necessary to validate the CHA port P or not (17004).

When it is judged in the step S17004 that the CHA port P needs to be validated, the port validating subprogram 210 executes the port validation processing to validate the CHA port P and make the CHA port P available (17005).

The path validating subprogram 220 executes the path validating processing to create a new access path that passes through the CHA port P now made available by the port validating processing of the step 17005 (17006). Then the integrated path-management subprogram 170 proceeds to a step 17007.

On the other hand, when it is judged in the step 17004 that validation of the CHA port P is unnecessary, the integrated path-management subprogram 170 moves to the step 17007 without executing the processing in the step 17005 and the step 17006.

In the step 17007, the integrated path-management subprogram 170 has the port invalidation judging subprogram 230 execute the port invalidation judging processing to judge whether it is necessary to invalidate the CHA port P or not.

When it is judged in the step 17007 that the CHA port P needs to be invalidated, the path invalidating subprogram 250 executes the path invalidating processing to delete an access path that passes through the CHA port P (17008).

Then the port invalidating subprogram 240 executes the port invalidating processing to invalidate the CHA port P and turn the CHA port P unavailable (17009), and the integrated path-management subprogram 170 proceeds to the step 17010.

On the other hand, when it is judged in the step 17007 that invalidation of the CHA port P is unnecessary, the integrated path-management subprogram 170 moves to the step S17010 without executing the processing in the step 17008 and the step 17009.

In the step 17010, the integrated path-management subprogram 170 checks the CHA port information 14003 of the port information 140 to judge whether there is any CHA port 620 that has not been chosen as the CHA port P, in other words, to judge whether there is any unprocessed CHA port 620.

When it is judged in the step 17010 that there is an unprocessed CHA port 620, the integrated path-management subprogram 170 returns to the step 17002 to choose a new CHA port 620 as the CHA port P.

When it is judged in the step 17010 that there is no CHA port 620 left unprocessed, the integrated path-management subprogram 170 ends the integrated path-management processing since every CHA port 620 has been processed.

In this embodiment, the integrated path-management subprogram 170 returns to the step 17002 when an unprocessed CHA port 620 is found in the step 17010. Alternatively, the integrated path-management subprogram 170 may return to the step 17001 in order to process the unprocessed CHA port 620 based on the latest port state. If it is known that there has been no change in state of ports and paths, the integrated path-management subprogram 170 may return to the step 17003.

Figure 15:
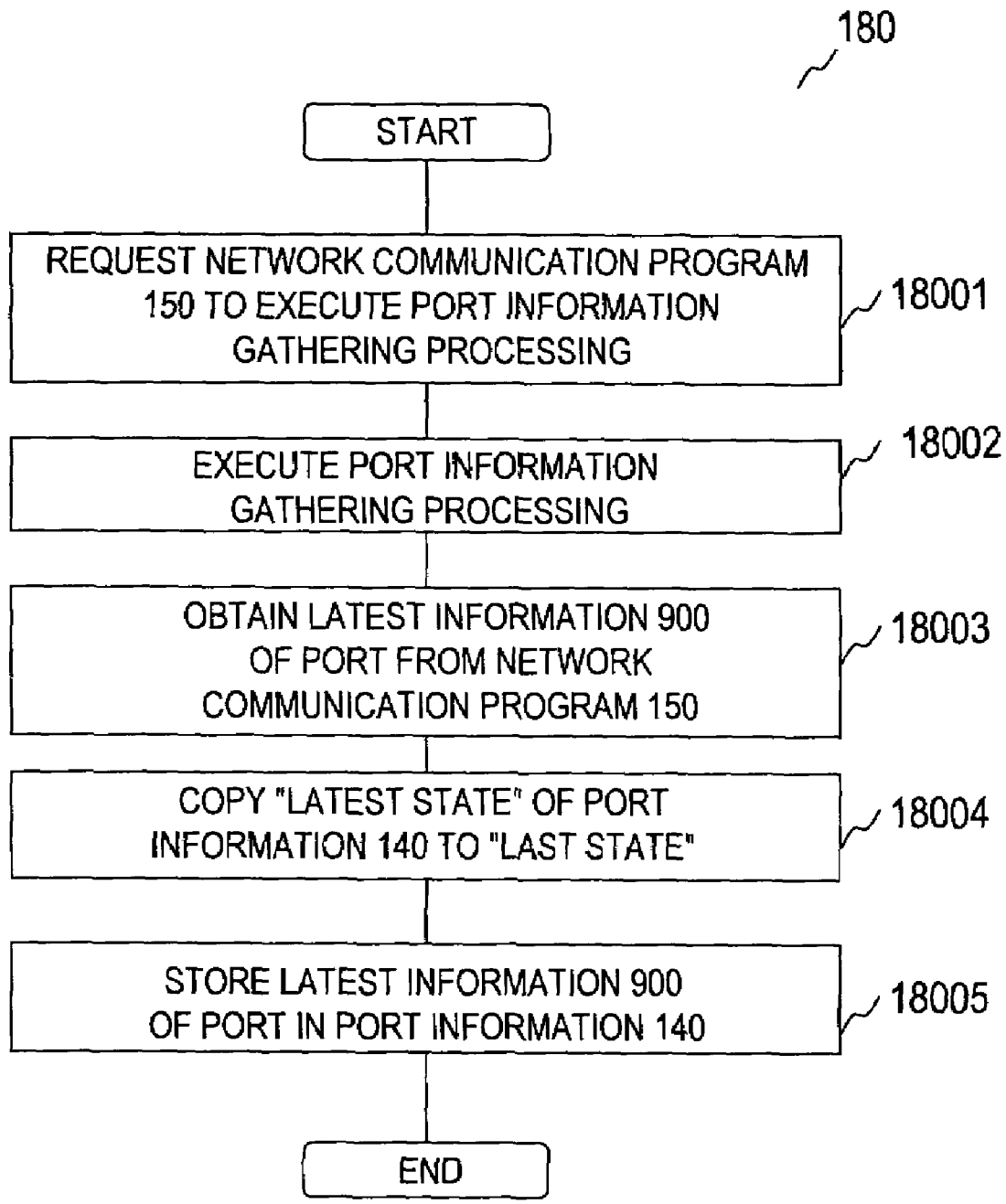
FIG. 15 is a flow chart for port state updating processing according to the first embodiment.

FIG. 15 is a flow chart for the port state updating processing executed by the port state updating subprogram 180 according to the first embodiment.

The port state updating subprogram 180 first requests, through the network communication program 150, the data storage system 600 to execute the port information gathering processing in order to cause the port information gathering subprogram 660 of the data storage system 600 to execute the port information gathering processing (18001).

The network communication program 150 sends the request for execution of the port information gathering processing to the data storage system 600 via the second network 410.

The data storage system 600 receives the request for execution of the port information gathering processing, and the port information gathering subprogram 660 executes the port information gathering processing (18002). Then the latest port information 900 including the latest used bandwidth ratio 90004 and state 90005 of the CHA ports 620 is created. The created latest port information 900 is sent to the integrated management server 100.

The integrated management server 100 obtains the latest port information 900 from the network communication program 150 (18003).

Lastly, a value written as the latest state 14006 in an entry of the port information 140 whose data storage system information, CHA information, and CHA port information match the data storage system information 90001, CHA information 90002, and CHA port information 90003 of the latest port information 900 is copied to overwrite the last state 14005 (18004).

Then the used ratio 14004 and the latest state 14006 in this entry are overwritten with values of the used ratio 90004 and the state 90005 in the latest port information 900. The updated port information 140 is stored in the disk device 110 (18005).

Figure 16:
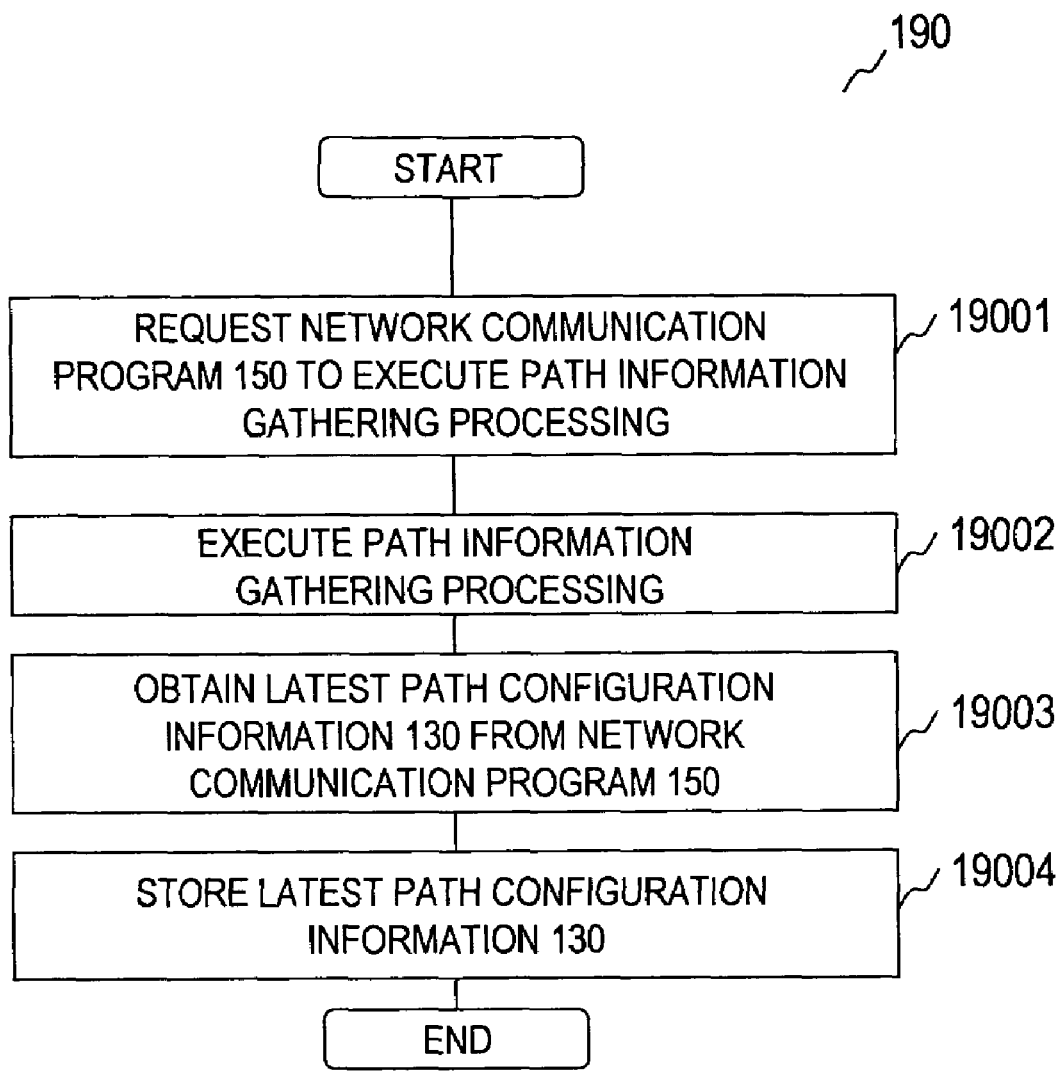
FIG. 16 is a flow chart for path state updating processing according to the first embodiment.

FIG. 16 is a flow chart for the path state updating processing executed by the path state updating subprogram 190 according to the first embodiment.

The path state updating subprogram 190 first requests, through the network communication program 150, the host computer 500 to execute the path information gathering processing in order to cause the path information gathering subprogram 550 of the host computer 500 to execute the path information gathering processing (19001).

The network communication program 150 sends the request for execution of the path information gathering processing to the host computer 500 via the second network 410.

The host computer 500 receives the request for execution of the path information gathering processing, and the path information gathering subprogram 550 executes the path information gathering processing (19002). Then a latest version of the path configuration information 130 is created, and the created path configuration information 130 is sent to the integrated management server 100.

The integrated management server 100 obtains the latest version of the path configuration information 130 from the network communication program 150 (19003).

Lastly, the path configuration information 130 that has been kept in the disk device 110 of the integrated management server 100 is overwritten with the latest version of the path configuration information 130. The thus updated path configuration information 130 is stored in the disk device 110 (19004).

Figure 17:
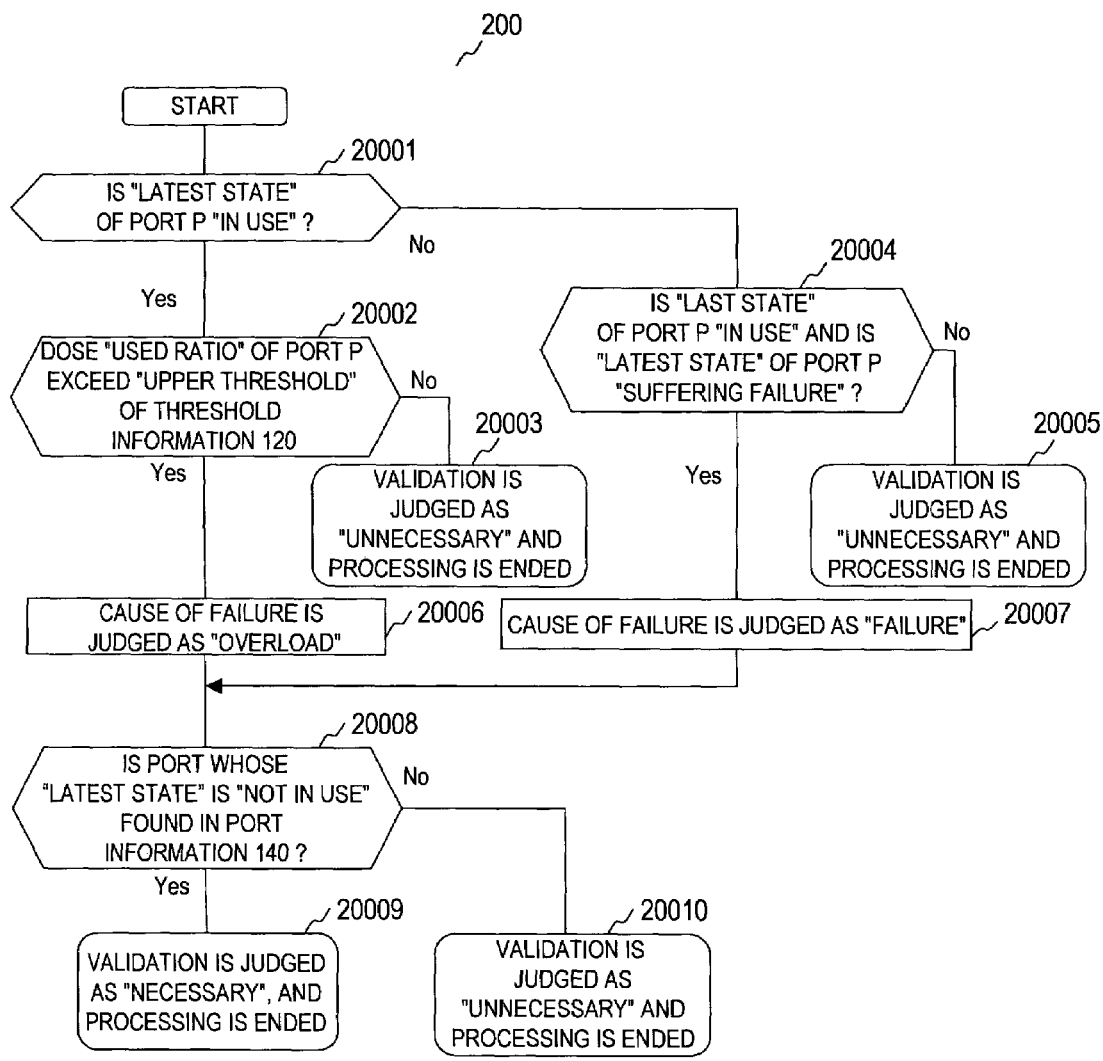
FIG. 17 is a flow chart for port validation judging processing according to the first embodiment.

FIG. 17 is a flow chart for the port validation judging processing executed by the port validation judging subprogram 200 according to the first embodiment.

In the port validation judging processing executed by the port validation judging subprogram 200, the following processing is performed on the CHA port P that is chosen in the step 17003 of the integrated path-management processing shown in FIG. 14.

First, the port validation judging subprogram 200 judges whether or not the latest state 14006 of the CHA port P is "in use" in the port information 140 in order to judge whether the CHA port P is currently available or not (20001).

When it is judged in the step S20001 that the CHA port P is available, the used ratio 14004 of the CHA port P in the port information 140 is compared against the upper threshold 12004 of the threshold information 120 to see whether or not the used ratio 14004 of the CHA port P exceeds the upper threshold 12004 in order to judge whether the CHA port P is overloaded or not (20002).

When it is found as a result that the used ratio 14004 of the CHA port P exceeds the upper threshold 12004, the CHA port P is judged as overloaded (20006).

When the used ratio 14004 of the CHA port P does not exceed the upper threshold 12004, it is judged that validation of a new port is unnecessary, and the port validation judging subprogram 200 ends the port validation judging processing (20003).

On the other hand, when it is judged in the step 20001 that the CHA port P is not in use at present, in other words, when the latest state 14006 of the CHA port P is not "in use", the port validation judging subprogram 200 checks whether or not the last state 14005 of the CHA port P is "in use" and the latest state 14006 of the CHA port P is "in failure" in the port information 140 in order to judge whether the reason the latest state 14006 of the CHA port P is not "in use" is a failure in the CHA port P or not (20004).

When it is found in the step 20004 that the last state 14005 of the CHA port P is "in use" and the latest state 14006 of the CHA port P is "in failure", in other words, when the CHA port P is suffering from a new failure, it is judged that the cause of the path failure is the failure in the CHA port P (20007).

When it is found in the step 20004 that the last state 14005 of the CHA port P is not "in use" or the latest state 14006 of the CHA port P is not "in failure", it means that no new failure has occurred in the CHA port P. Accordingly, validation of the port is judged as unnecessary, and the port validation judging subprogram 200 ends the port validation judging processing (20005).

In the case where the cause of failure is judged as port overload in the step 2006 or the cause of failure is judged as a port failure in the step 20007, it is judged whether or not there is any CHA port whose latest state 14006 is "not in use" in the port information 140 in order to check whether any unavailable CHA port 620 is present or not (20008).

When an unavailable CHA port 620 is found in the step 20008, port validation is judged as necessary and the port validation judging subprogram 200 ends the port validation judging processing (20009).

On the other hand, there is no unavailable port, port validation is judged as unnecessary, and the port validation judging subprogram 200 ends the port validation judging processing (20010).

Figure 18:
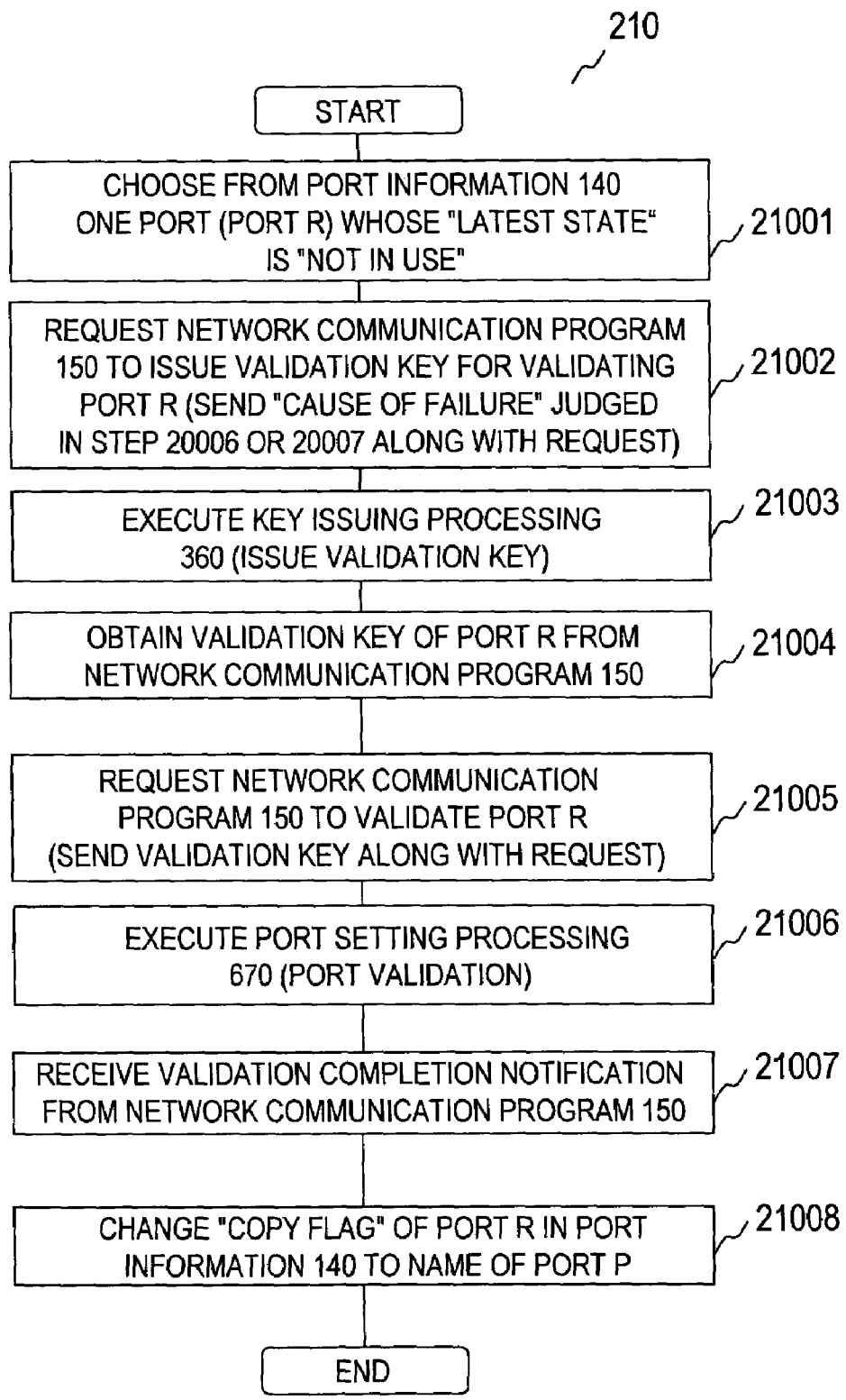
FIG. 18 is a flow chart for port validating processing according to the first embodiment.

FIG. 18 is a flow chart for the port validating processing executed by the port validating subprogram 210 according to the first embodiment.

In the port validating processing executed by the port validating subprogram 210, one CHA port is chosen first whose latest state 14006 is "not in use" in the port information 140 (the chosen port is hereinafter referred to as CHA port R). From an entry of the chosen CHA port R in the port information 140, the data storage system information 14001, the CHA information 14002, the CHA port information 14003, the used ratio 14004, the last state 14005, the latest state 14006, and the copy flag 14007 are extracted and stored in the work area 750a, which is secured in the main memory 730a of the integrated management server 100 (21001).

The port validating subprogram 210 next requests, through the network communication program 150, the key issuing subprogram 360 to execute the key issuing processing and issue a license key for validating the CHA port R in order to cause the key issuing subprogram 360 of the license management server 300 to execute the key issuing processing (21002).

In the step 21002, the port validating subprogram 210 sends, to the network communication program 150, to be delivered to the license management server 300, the information about whether the CHA port P is overloading or experiencing a failure which has been obtained in the step 20006 of the port validation judging processing executed by the port validation judging subprogram 200, or the information about the cause of the failure of the CHA port P which has been obtained in the step 20007 of the port validation judging processing.

The network communication program 150 sends the request for execution of the key issuing processing to the license management server 300 via the second network 410.

The license management server 300 receives the request for execution of the key issuing processing, and the key issuing subprogram 360 executes the key issuing processing (21003).

Through the key issuing processing in the step 21003, a license key for validating the CHA port R is issued and sent to the integrated management server 100.

The integrated management server 100 obtains the license key for validating the CHA port R from the network communication program 150 (21004).

Next, the port validating subprogram 210 requests, through the network communication program 150, the port setting subprogram 670 of the data storage system 600 to execute the port setting processing in order to validate the CHA port R (21005).

In the step 21005, the port validating subprogram 210 sends, to the data storage system 600, to the network communication program 150, to be delivered to the data storage system 600, the license key for validating the CHA port R which has been obtained in the step 21004.

The network communication program 150 sends the request for execution of the port setting processing to the data storage system 600 via the second network 410.

The data storage system 600 receives the request for execution of the port setting processing, and the port setting subprogram 670 executes the port setting processing to validate the CHA port R (21006). The CHA port R is thus made available. Then the port setting subprogram 670 notifies, through the network communication program 640, the integrated management server 100 of the change of the CHA port R to an available state.

The integrated management server 100 receives the notification of the change of the CHA port R to an available state (validation completion notification) (21007).

Validation of the CHA port R is completed in the step 21007. Thus the CHA port R is newly validated and made available as a substitute for the CHA port P which has ceased to function due to overload or a failure. Here, the CHA port P is called an original port and the CHA port R is called a copy port.

Receiving the notification of completing validating the CHA port R, the integrated management server 100 overwrites the copy flag 14007 of the CHA port R in the port information 140 with the CHA port information 14003 of the CHA port P in the port information 140 in order to show that the CHA port R is a copy port of the CHA port P. The updated port information 140 is stored in the disk device 110 of the integrated management server 100 (21008).

Figure 19:
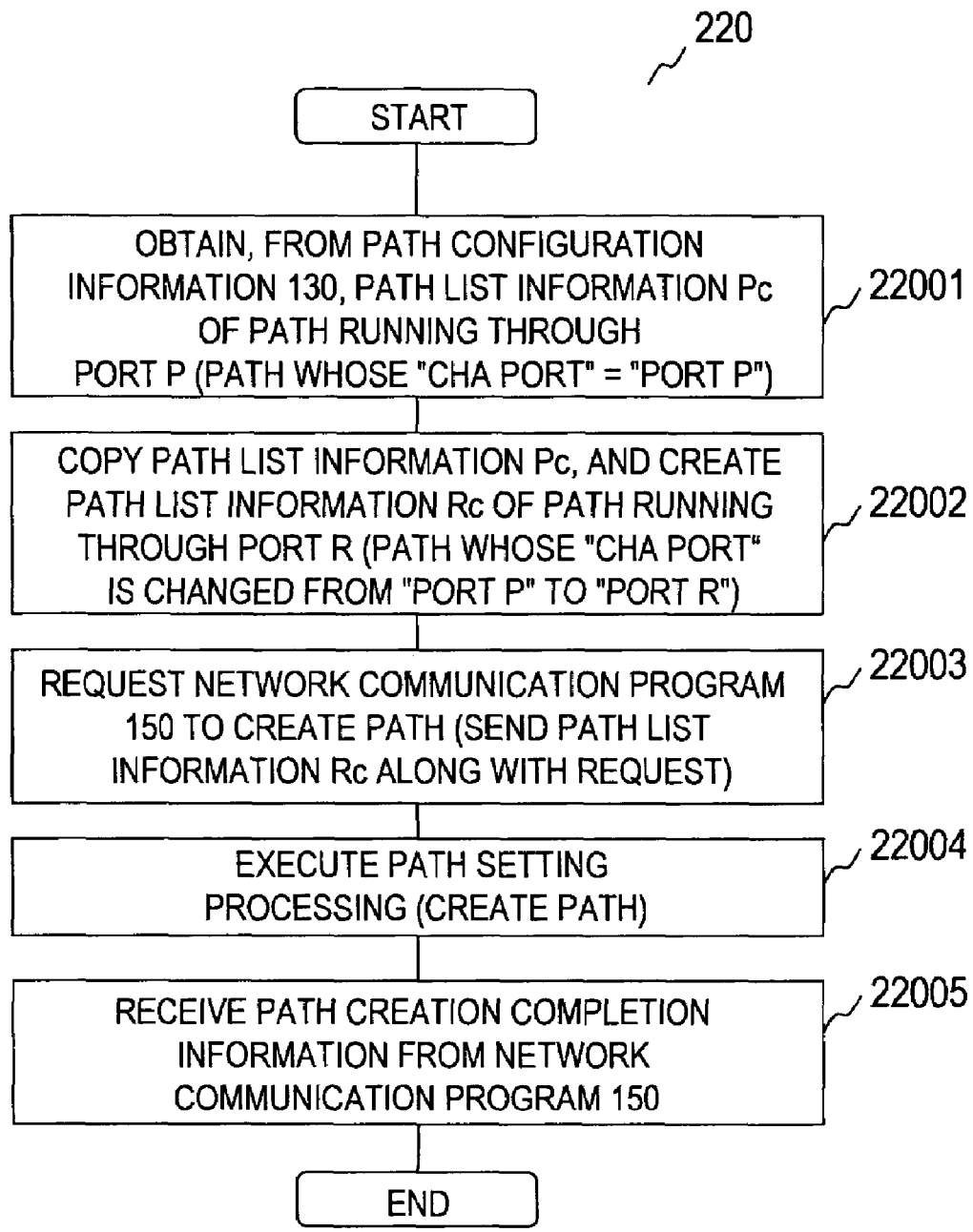
FIG. 19 is a flow chart for path validating processing according to the first embodiment.

FIG. 19 is a flow chart for the path validating processing executed by the path validating subprogram 220 according to the first embodiment.

First, entries of the path configuration information 130 are sequentially checked to obtain path list information about paths that pass through the CHA port P (22001).

Obtained as the path list information (hereinafter denoted by Pc) is every item of information about an access path whose data storage system information 13006, CHA information 13007, and CHA port information 13008 in the path configuration information 130 match the data storage system information 14001, the CHA information 14002, and the CHA port information 14003 in the port information 140, respectively.

What is meant by "every item of information" are the path information 13001, host information 13002, HBA information 13003, HBA port information 13004, multipath logical volume information 13005, data storage system information 13006, CHA information 13007, CHA port information 13008, and logical volume information 13009 of the access path.

To give a more detailed description with reference to FIG. 9, when the CHA port P has "USP1" as the data storage system information 13006, "CHA1" as the CHA information 13007, and "P1" as the CHA port information 13008, every item of information of access paths Path1 and Path2 is obtained as the path list information Pc.

The obtained path list information Pc is copied to create a new entry. A value of the CHA port information 13008 in the created entry is rewritten with a value of the CHA port information 14003 of the CHA port R to create path list information Rc (22002).

Next, the path validating subprogram 220 requests, through the network communication program 150 of the integrated management server 100, the pas setting subprogram 680 of the data storage system 600 to create an access path in the path list information Rc created in the step 22002 (22003).

In the step 22003, the path validating subprogram 220 sends the path list information Rc created in the step 22002 to the data storage system 600.

The network communication program 150 sends the request for creation of the access path to the network communication program 640 of the data storage system 600 via the second network 410.

The data storage system 600 receives the request for creation of the access path, and the data storage system management program 650 has the path setting subprogram 680 execute the path setting processing to create the access path based on the path list information Rc (22004).

After the access path is created through the path setting processing, the data storage system management program 650 requests the network communication program 640 to send a path creation completion notification to the integrated management server 100.

The integrated management server 100 receives the path creation completion notification (22005).

Figure 20:
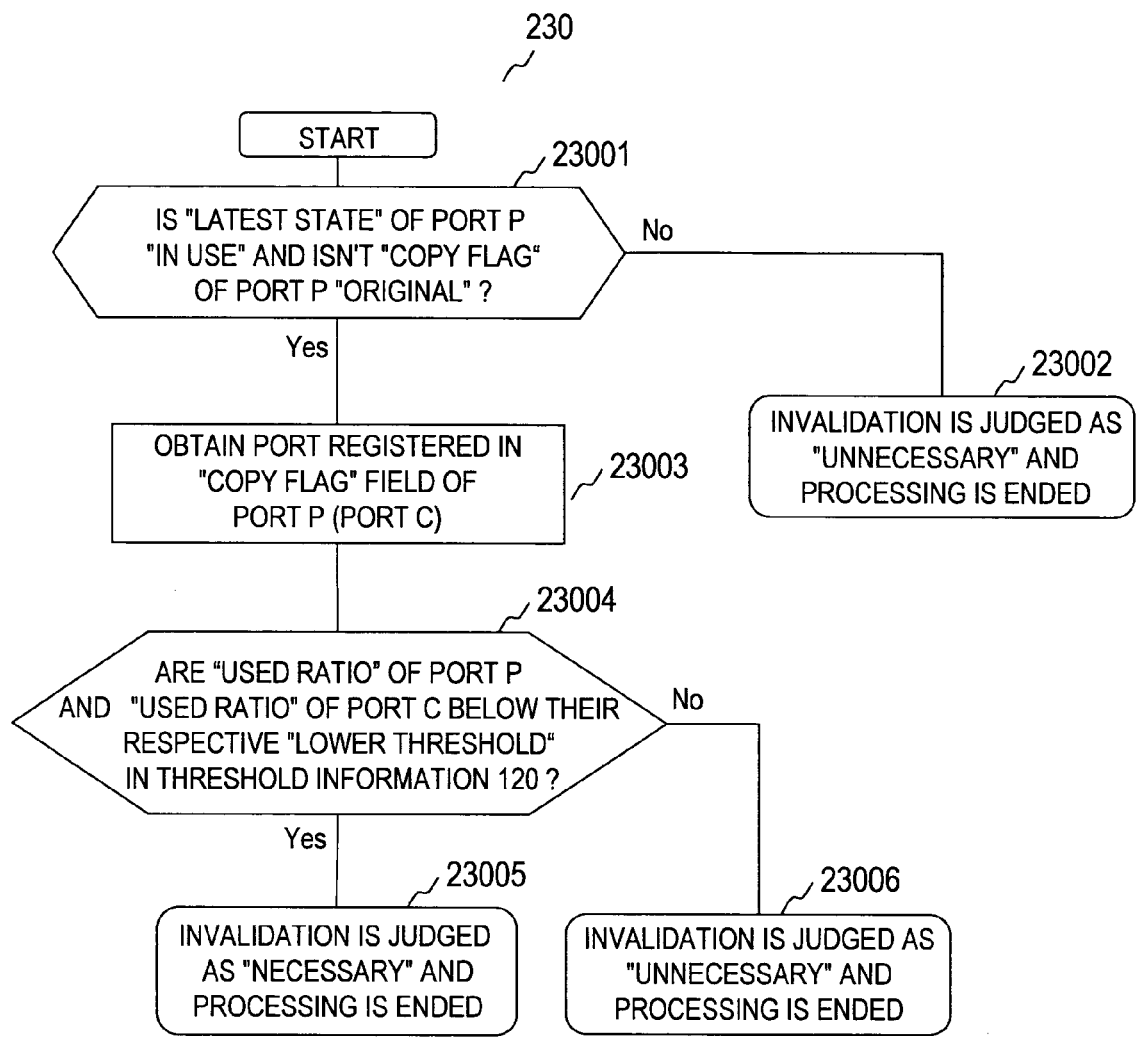
FIG. 20 is a flow chart for port invalidation judging processing according to the first embodiment.

FIG. 20 is a flow chart for the port invalidation judging processing executed by the port invalidation judging subprogram 230 according to the first embodiment.

In the port invalidation judging processing executed by the port invalidation judging subprogram 230, the following processing is performed on the CHA port P chosen in the step 17003 of the integrated path-management processing by the integrated path-management subprogram 170.

The port invalidation judging subprogram 230 first checks whether or not the latest state 14006 of the port information 140 is "in use" and a value entered as the copy flag 14007 of the port information 140 is not one that indicates the port is an original port, to thereby judge whether the CHA port P is a copy port or not (23001).

When it is found in the step 23001 that the latest state 14006 of the port information 140 is "in use" and a value entered as the copy flag 14007 is not one that indicates the port is an original port, this port is judged as a copy port. Then the port invalidation judging subprogram 230 obtains information of a port that matches the CHA port P in terms of the data storage system information 14001 and the CHA information 14002 and whose copy flag 14007 matches the CHA port information 14003 of the CHA port P in order to obtain information of the original port of the CHA port P (the original CHA port of which information is obtained is hereinafter referred to as CHA port C) (23003).

The obtained information of the CHA port C includes the data storage system information 14001, the CHA information 14002, and the CHA port information 14003.

On the other hand, when it is found in the step 23001 that the latest state 14006 of the CHA port P in the port information 140 is not "in use" or a value entered as the copy flag 14007 is one that indicates the CHA port P is an original port, it is judged that this port is not a copy port. Then invalidation of the CHA port 620 is judged as unnecessary, and the port invalidation judging processing is ended (23002).

Next, the port invalidation judging processing 230 judges whether or not the used ratio 14004 of the CHA port P in the port information 140 is below the lower threshold 12005 of the CHA port P in the threshold information 120 and the used ratio 14004 of the CHA port C in the port information 140 is below the lower threshold 12005 of the CHA port C in the threshold information 120 (23004).

When it is judged as a result that the CHA port P and the CHA port C are both lightly loaded, invalidating the CHA port P is unlikely to lower QoS. Accordingly, port invalidation is judged as necessary, and the port invalidation judging processing is ended (23005).

When it is judged that either the CHA port P or the CHA port C is not lightly loaded, port invalidation is judged as unnecessary and the port invalidation judging processing is ended (23006).

Figure 21:
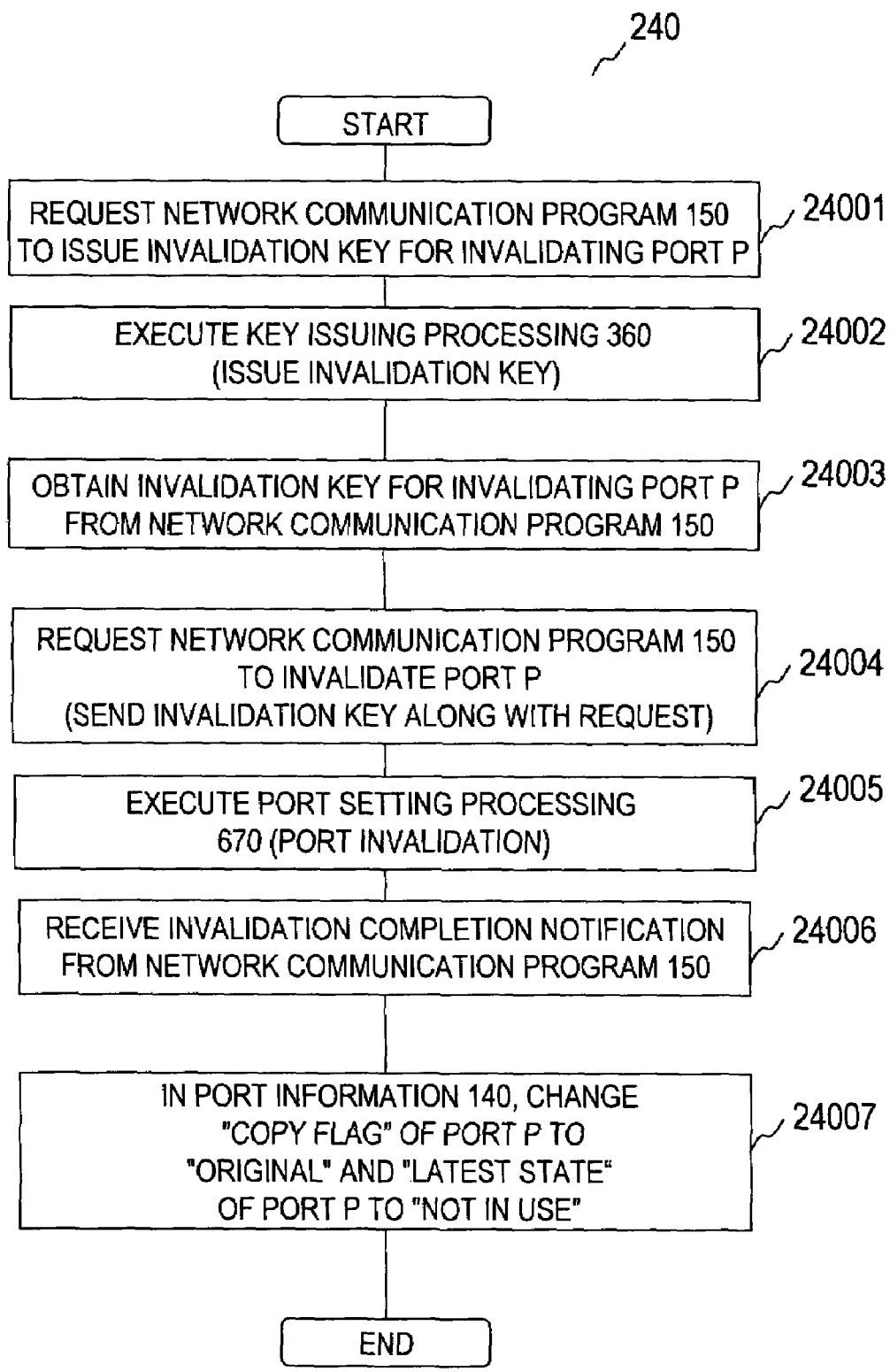
FIG. 21 is a flow chart for port invalidating processing according to the first embodiment.

FIG. 21 is a flow chart for the port invalidating processing executed by the port invalidating subprogram 240 according to the first embodiment.

In the port invalidating processing, the port invalidating subprogram 240 first requests, through the network communication program 150, the key issuing subprogram 360 of the license management server 300 to execute the key issuing processing in order to cause the key issuing subprogram 360 to issue a license key for invalidating the CHA port P (24001).

The network communication program 150 of the integrated management server 100 sends the request for execution of the key issuing processing to the license management server 300 via the second network 410, and the key issuing subprogram 360 of the license management program 350 executes the key issuing processing. The license key issued is sent to the integrated management server 100 (24002).

The next step of the port invalidating processing is to obtain, from the network communication program 150, the license key for invalidating the CHA port P which has been issued through the key issuing processing (24003).

The port invalidating subprogram 240 then requests, through the network communication program 150, the port setting subprogram 670 to execute the port setting processing in order to invalidate the CHA port P (24004).

In the step 24004, the port invalidating subprogram 240 sends, through the network communication program 150, to the data storage system 600, the license key for invalidating the CHA port P which has been obtained in the step 24003.

The network communication program 150 sends the request for execution of the port setting processing to the data storage system 600 via the second network 410.

The data storage system 600 receives the request for execution of the port setting processing, and the port setting subprogram 670 executes the port setting processing to invalidate the CHA port P (24005). The CHA port P is thus turned unavailable. Then the port setting subprogram 670 notifies, through the network communication program 640, the integrated management server 100 of the change of the CHA port P to an unavailable state.

The integrated management server 100 receives the notification of the change of the CHA port P to an unavailable state (invalidation completion notification) (24006).

Upon reception of the notification of completing invalidating the CHA port P, the integrated management server 100 rewrites the copy flag 14007 of the CHA port P in the port information 140 to "original" and the latest state 14006 to "not in use". The thus updated port information 140 is stored in the disk device 110 of the integrated management server 100 (24007).

Figure 22:
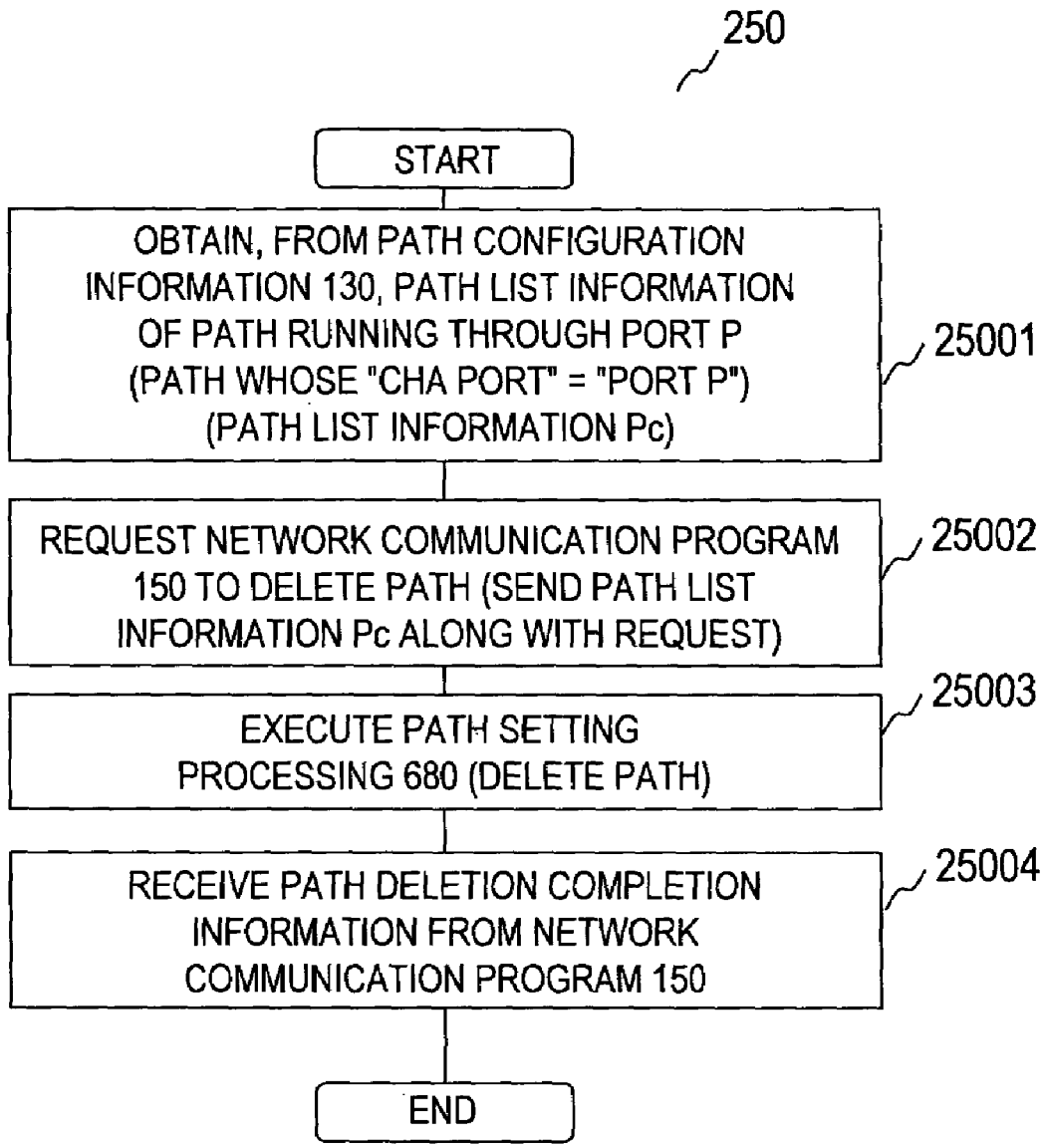
FIG. 22 is a flow chart for path invalidating processing according to the first embodiment.

FIG. 22 is a flow chart for the path invalidating processing executed by the path invalidating subprogram 250 according to the first embodiment.

The path invalidating processing executed by the path invalidating subprogram 250 deletes every path that passes through the copy port P to be invalidated.

First, entries of the path configuration information 130 are sequentially checked to obtain information about paths that pass through the CHA port P (path list information) (25001).

Obtained as the path list information (hereinafter denoted by Pc) is every item of information about an access path whose data storage system information 13006, CHA information 13007, and CHA port information 13008 in the path configuration information 130 match the data storage system information 14001, CHA information 14002, and CHA port information 14003 of the CHA port P, respectively.

What is meant by "every item of information" are the path information 13001, host information 13002, HBA information 13003, HBA port information 13004, multipath logical volume information 13005, data storage system information 13006, CHA information 13007, CHA port information 13008, and logical volume information 13009 of the access path.

To give a more detailed description with reference to FIG. 9, when the CHA port P has "USP1" as the data storage system information 13006, "CHA1" as the CHA information 13007, and "P1" as the CHA port information 13008, every item of information of access paths Path1 and Path2 is obtained as the path list information Pc.

The path invalidating subprogram 250 then requests, through the network communication program 150 of the integrated management server 100, the path setting subprogram 680 of the data storage system 600 to delete the access paths in the path list information Pc created in the step 25001 (25002).

In the step 25002, the path invalidating subprogram 250 sends the path list information Pc created in the step 25001 to the integrated management server 100.

The network communication program 150 sends the request for deletion of the access paths to the network communication program 640 of the data storage system 600 via the second network 410.

The data storage system 600 receives the request for deletion of the access paths, and the data storage system management program 650 has the path setting subprogram 680 execute the path setting processing to delete the access paths based on the path list information Pc (25003).

After the access paths are deleted through the path setting processing, the data storage system management program 650 requests the network communication program 640 to send a path deletion completion notification to the integrated management server 100.

The integrated management server 100 receives the path deletion completion notification (25004).

Figure 23:
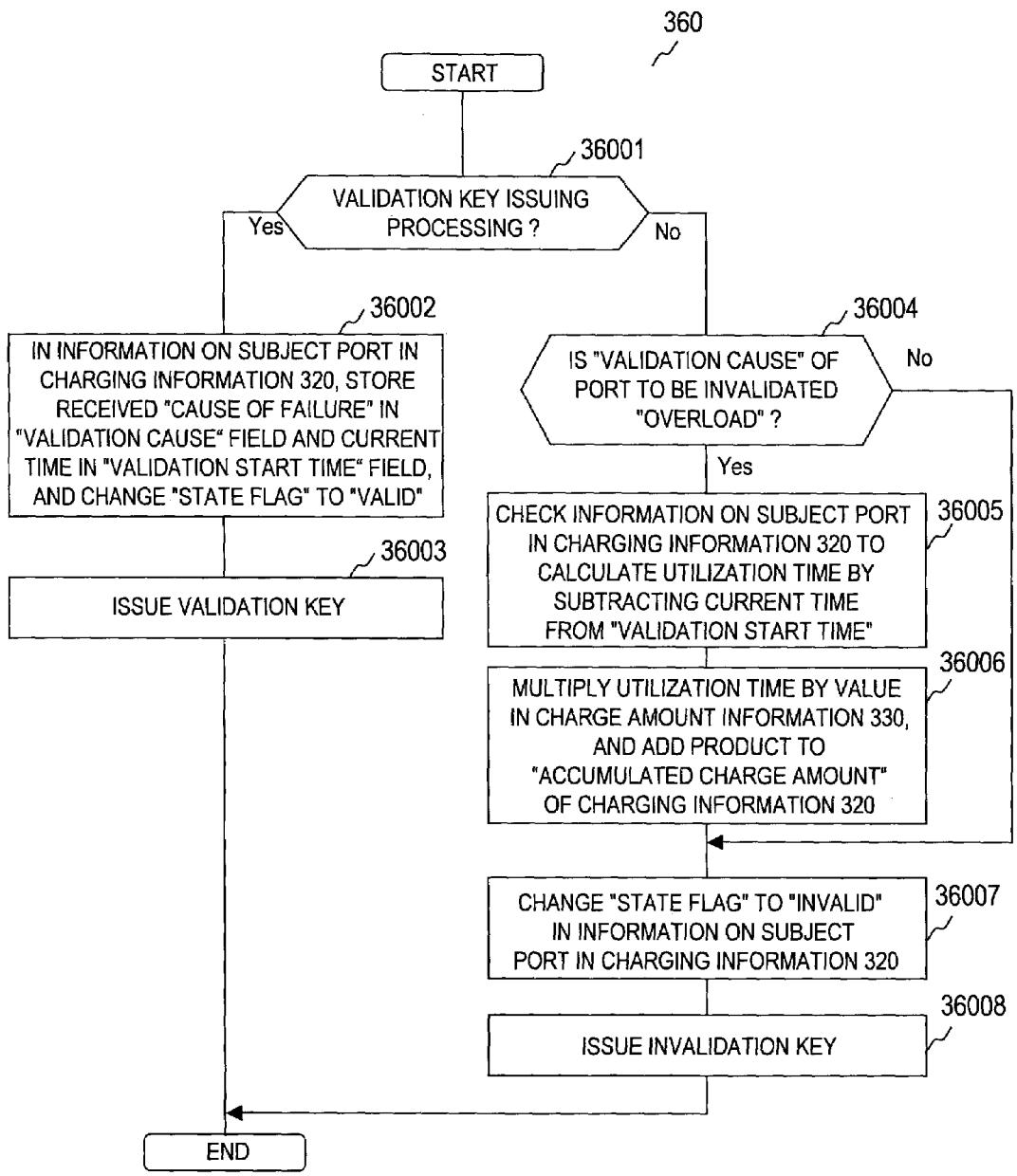
FIG. 23 is a flow chart for key issuing processing according to the first embodiment.

FIG. 23 is a flow chart presented to illustrate the key issuing processing executed by the key issuing subprogram 360 according to the first embodiment.

In the key issuing processing, the key issuing subprogram 360 judges whether a request received by the network communication program 340 is a request to issue a license key that validates the CHA port 620 or a request to issue a license key that invalidates the CHA port 620 (36001).

When the received request is judged in the step 36001 as a request to issue a license key that validates the CHA port 620, the key issuing subprogram 360 issues a license key that validates the CHA port 620.

Specifically, the cause of issuing a license key and the time at which validation of the CHA port 620 is started are managed as follows:

The cause of failure which has been obtained in the step 20006 or the step 20007 of the port validation judging processing executed by the port validation judging subprogram 200, namely, overload or a failure, is stored as the validation cause 32005 of the CHA port to be validated in the charging information 320.

The year, month, and date on which the CHA port 620 is validated is stored as the validation start time 32006 of the CHA port to be validated in the charging information 320. The state flag 32004 of this CHA port is also changed to "valid" in the charging information 320 (36002).

The next step of the key issuing processing is to issue a validation license key for validating the CHA port 620 and send the license to the network communication program 340 (36003). Then the key issuing processing is ended.

In the case where the received request is judged in the step 36001 as a request to issue a license key for invalidating the CHA port 620, the license key for invalidating the CHA port 620 is issued.

Specifically, in order to charge fees differently depending on the cause validating the CHA port 620 and the cause of failure, the key issuing subprogram 360 judges whether or not the validation cause 32005 of the CHA port to be invalidated is "overload" in the charging information 320 (36004).

When it is judged in the step 36004 that the validation cause is overload, a charge amount depending on a time counted from when the CHA port 620 is validated until when the CHA port 620 is invalidated is added to the accumulated charge amount 32007 of the charging information 320.

Specifically, the utilization time of the CHA port that is to be invalidated is calculated by subtracting the time at which the CHA port is invalidated (current time) from the validation start time 32006 of this CHA port in the charging information 320 (36005).

The utilization time calculated in the step 36005 is multiplied by the per-unit charge amount in the charge amount information 330, and the product is added to the accumulated charge amount 32007 of the charging information 320 (36006). The key issuing subprogram 360 then proceeds to the step 36007.

On the other hand, when it is judged in the step 36004 that the validation cause is not overload, in other words, the validation cause is a failure in the CHA port 620, there is no charge for the use of the CHA port 620 during this validation period. Accordingly, the key issuing subprogram 360 moves to the step 36007 without executing the step 36005 and the step 36006.

In this embodiment, the charge amount is rewritten only when the validation cause is overload. However, this is merely an example and various modifications can be made. A case of rewriting the charge amount when the validation cause is a failure as well as when the validation cause is overload will be described later as another example.

In the step 36007, the state flag 32004 of the CHA port to be invalidated is changed to "invalid" in the charging information 320.

The key issuing subprogram 360 then issues an invalidation license key for invalidating the CHA port 620 and sends the license to the network communication program 340 (36008). This completes the key issuing processing.

Figure 24:
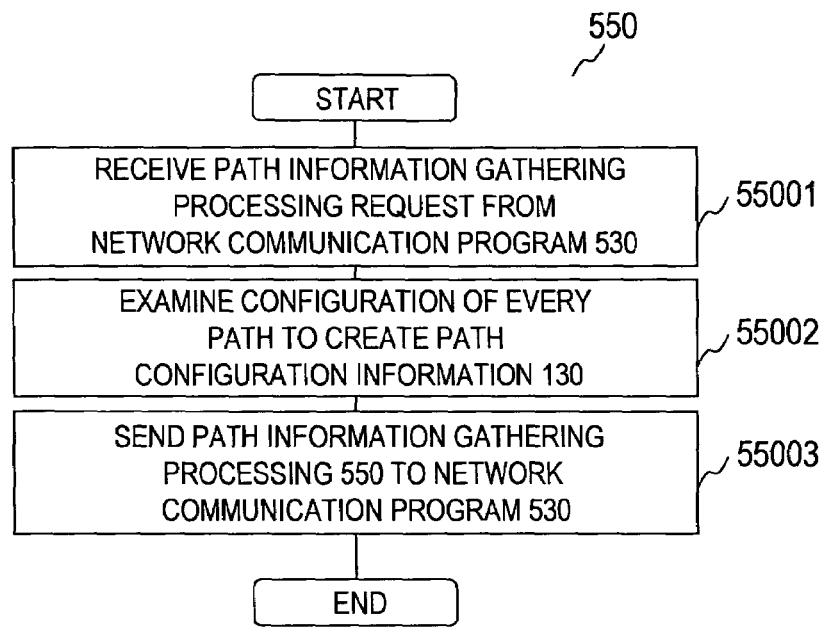
FIG. 24 is a flow chart for path information gathering processing according to the first embodiment.

FIG. 24 is a flow chart for the path information gathering processing executed by the path information gathering subprogram 550 according to the first embodiment.

The path information gathering subprogram 550 receives, from the network communication program 530, an access path information collection request sent from the integrated management server 100 (55001).

The path information gathering subprogram 550 next obtains the configuration of every access path, namely, the path information 13001, the host information 13002, the HBA information 13003, the HBA port information 13004, the multipath logical volume information 13005, the data storage system information 13006, the CHA information 13007, the CHA port information 13008, and the logical volume information 13009, and creates the path configuration information 130 (55002).

Lastly, the created path configuration information 130 is sent to the network communication program 530 of the host computer 500 (55003).

Figure 25:
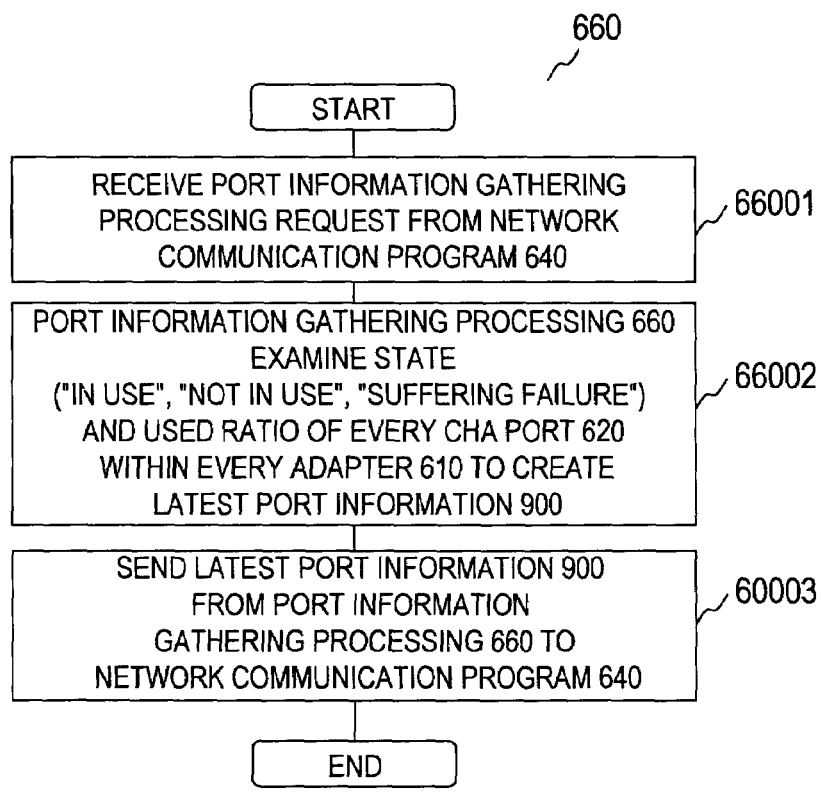
FIG. 25 is a flow chart for port information gathering processing according to the first embodiment.

FIG. 25 is a flow chart for the port information gathering processing executed by the port information gathering subprogram 660 according to the first embodiment.

The port information gathering subprogram 660 receives a port information gathering request from the network communication program 640 (66001).

The port information gathering subprogram 660 next obtains information, namely, the used ratio and state, of the CHA ports 620, and creates the latest port information 900 (66002).

Lastly, the created latest port information 900 is sent to the network communication program 640 of the data storage system 600 (66003).

Figure 26:
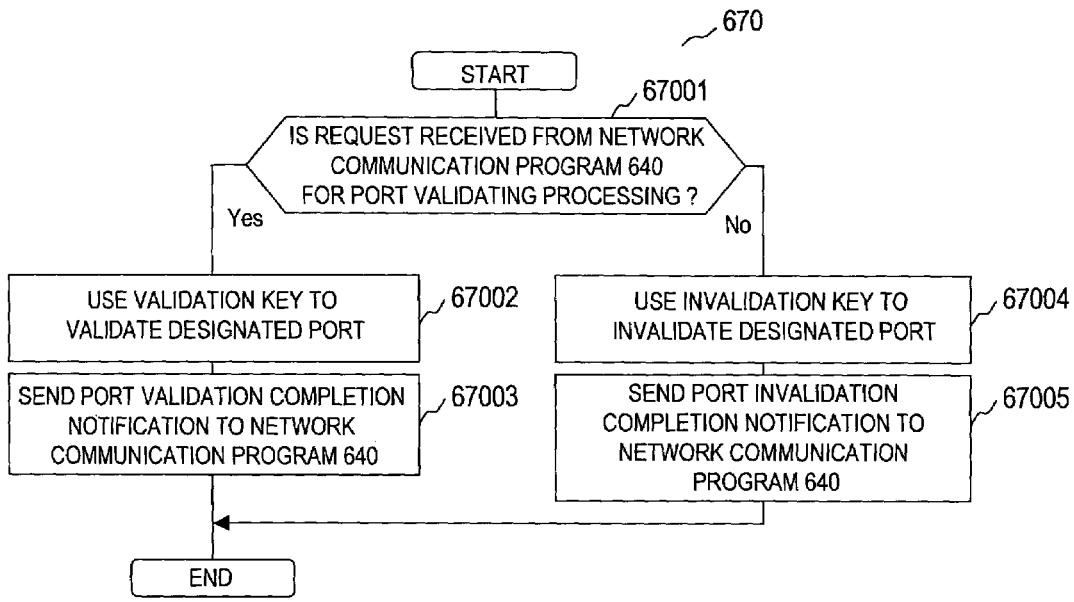
FIG. 26 is a flow chart for port setting processing according to the first embodiment.

FIG. 26 is a flow chart for the port setting processing executed by the port setting subprogram 670 according to the first embodiment.

The port setting subprogram 670 first judges whether a request sent from the network communication program 640 is for a port validating processing or for a port invalidating processing (67001).

When the received request is judged in the step 67001 as a request for port validating processing, a designated CHA port is validated with a license key for validating a CHA port (67002). Then a port validation completion notification is sent to the network communication program 640 (67003).

When the received request is judged in the step 67001 as a request for port invalidating processing, a designated CHA port is invalidated with a license key for invalidating a CHA port (67004). Then a port invalidation completion notification is sent to the network communication program 640 (67005).

Figure 27:
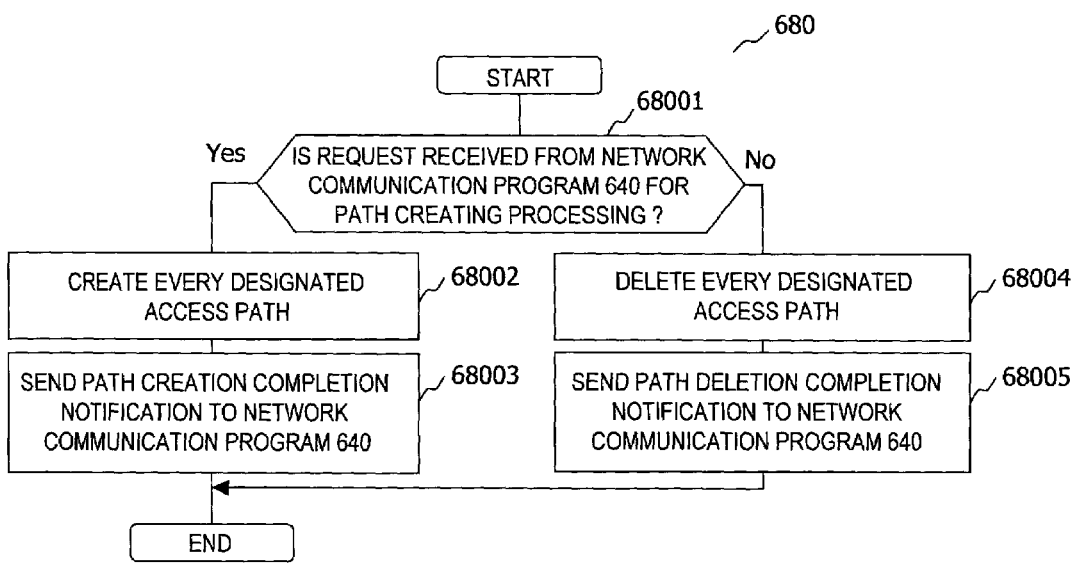
FIG. 27 is a flow chart for path setting processing according to the first embodiment.

FIG. 27 is a flow chart for the path setting processing executed by the path setting subprogram 680 according to the first embodiment.

The path setting subprogram 680 judges whether a request sent from the network communication program 640 is for a path creation processing or for a path deletion processing (68001).

When the received request is judged in the step 68001 as a request for path creating processing, every designated path is sequentially created (68002). Then a path creation completion notification is sent to the network communication program 640 (68003).

When the received request is judged in the step 68001 as a request for path deleting processing, every designated path is deleted (68004). Then a path deletion completion notification is sent to the network communication program 640 (68005).

Described next is processing performed by the integrated path-management subprogram 170 of the integrated management server 100 when the processing shown in FIGS. 14 to 27 is executed in multipath management of FIG. 28.

Figure 28:
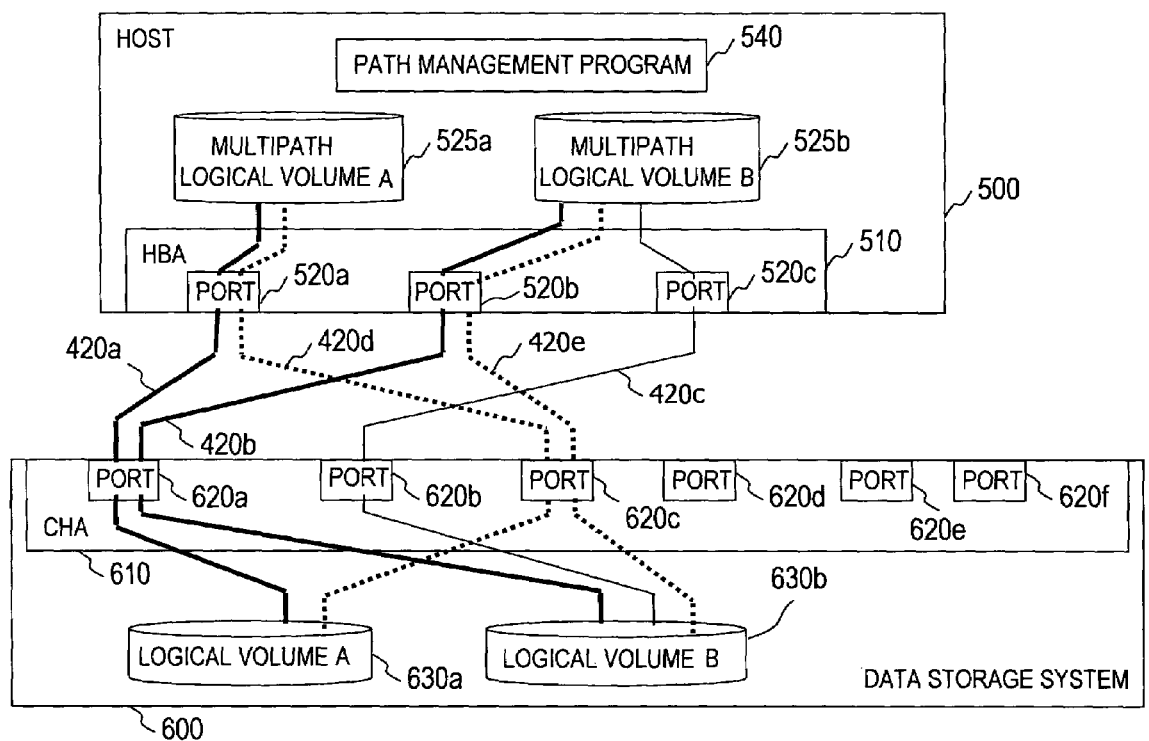
FIG. 28 is an explanatory diagram showing an access path configuration according to the first embodiment.

FIG. 28 is a diagram showing an example of access paths in multipath management applied to the computer system of FIG. 7. Shown in FIG. 28 is an example of expanding the access path bandwidth by turning the CHA port 620 that is unavailable due to its overload or failure assumed in the CHA port 620 into an available port, copying information of an access path that passes through the CHA port 620 that is unavailable due to overload or a failure, and creating an access path that passes through the newly added port.

The integrated path-management subprogram 170 of the integrated management server 100 first executes the integrated path-management processing and continuously monitors the state (load, failure) of the CHA ports 620. To monitor the CHA ports 620, the port state updating subprogram 180 executes the port state updating processing and periodically (at predetermined time intervals) requests the port information gathering subprogram 660 of the data storage system 600 to provide the latest port state, from which the latest port information 900 is created. The port information 140 is updated with the latest port information 900 and stored in the disk device 110 of the integrated management server 100 (17001).

The integrated management server 100 makes the path state updating subprogram 190 execute the path state updating processing to request the path information gathering subprogram 550 of the host computer 500 to execute the path information gathering processing and create the path configuration information 130 periodically. The created path configuration information 130 is stored in the disk device 110 of the integrated management server 100 (17002).

The integrated management server 100 sequentially checks, by loop processing or the like, entries of the port information 140 kept in the disk device 110, and judges the CHA port 620 whose used ratio 14004 in the port information 140 exceeds the preset upper threshold 12004 of the threshold information 120 as overloaded. In the case where the last state 14005 of one CHA port 620 is "in use" and the latest state 14006 is "in failure" in the port information 140, it is judged that this CHA port 620 is experiencing a failure and that a new CHA port needs to be validated and made available (17004).

Considered here is a case in which the CHA port 620a used for normal operation in the example of FIGS. 7 and 28 overloads or a failure occurs in the CHA port 620a.

A currently unavailable CHA port is chosen as a substitute for the CHA port 620 where a failure has occurred. The integrated management server 100 sequentially checks, by loop processing or the like, entries of the port information 140 in the data storage system 600 to choose one unused port. In the example of FIG. 7, the CHA ports that are currently not in use and not available are the CHA ports 620c, 620d, 620e, and 620f, and the integrated management server 100 chooses the CHA port 620c.

The integrated management server 100 performs processing of making the unused CHA port 620 available.

Specifically, the integrated management server 100 requests, via the second network 410, the key issuing subprogram 360 of the license management server 300 to execute the key issuing processing in which a license key for validating the CHA port 620 that is not in use is issued.

Through the key issuing processing 360 executed by the key issuing subprogram 360, the validation start time 32006 and the validation cause 32006 (specifically, information on whether it is overload, a failure, or other cause) are stored in the charging information 320, which is kept in the disk device 310 of the license management server 300. This makes it possible to charge by counting in only the length of time the port is in use and to charge differently depending on the cause of issuing a validation key.

The integrated management server 100 sends, to the data storage system 600, via the second network 410, a validation license key for validating the CHA port 620 which is issued by the license management server 300. The port setting subprogram 670 of the data storage system 600 validates the CHA port 620 that has been unavailable. In other words, the port setting subprogram 670 makes an unused port available (17005).

The newly validated CHA port 620 is a copy port and the CHA port 620 where a failure has occurred is the original port.

The integrated management server 100 stores, in the port information 140, information on the newly validated CHA port 620, namely, the copy port.

In the example shown in FIG. 28, the CHA port 620c is turned available as a copy port of the CHA port 620a, which is the original port.

Next, an access path that passes through the validated CHA port 620 is created to thereby add to the access path bandwidth (17006).

An access path to be created is selected by copying every access path that passes through the CHA port 620 where a failure has occurred, and an access path that passes through the newly validated CHA port 620 is created.

Alternatively, an access path that passes through the newly validated CHA port 620 may be created by sequentially checking the load of access paths that pass through the CHA port 620 judged as suffering from a failure and by copying only access paths that are heavily loaded.

The integrated management server 100 requests, via the second network 410, the path setting subprogram 680 of the data storage system 600 to execute the path setting processing to create the access path.

In the example shown in FIG. 28, two access paths 420d and 420e which pass through the CHA port 620c are newly added to the existing access paths 420a, 420b, and 420c of FIG. 2.

In the path configuration information 130, the HBA port information 13004, the CHA port information 13008 and the logical volume information 13009 are picked up from entries of the access paths 420a and 420b, which pass through the CHA port 620a suffering from overload or a failure. According to the picked up information, the access path 420a includes the HBA port 520a, the CHA port 620a, and the logical volume A 630a, and the access path 420b includes the HBA port 520b, the CHA port 620a, and the logical volume B 630b. The access paths 420a and 420b are indicated by bold lines in FIG. 28.

When overload or breakdown of the CHA port 620a causes overload or a failure in the access paths 420a and 420b, two access paths 420d and 420e, which are obtained by copying information of the access paths 420a and 420b and rewriting the copied information such that the passing CHA port is the CHA port 620c, are determined as to-be-newly-added access paths and created. The access path 420d includes the HBA port 520a, the CHA port 620c, and the logical volume 630a. The access path 420e includes the HBA port 520b, the CHA port 620c and the logical volume 630b. The access paths 420d and 420e are indicated by dotted lines in FIG. 28.

The path load balancing subprogram 560 of the host computer 500 distributes the load of I/O requests between newly created access paths and existing access paths, to thereby maintain QoS of the access path bandwidth.

In FIG. 28, newly created access paths are the access paths 420d and 420e, and existing access paths are the access paths 420a, 420b, and 420c.

When overload of a CHA port, a failure in a CHA port, or the like narrows the access path bandwidth, a new access path is added to thereby increase the number of access paths and expand the access path bandwidth.

Another example is shown in which, when the load of the available CHA port 620c is lessened by lowering of the used ratio of the CHA port 620c or from other reasons in the access path configuration of FIGS. 7 and 28, the access path bandwidth is reduced by deleting an access path that passes through the CHA port 620c and turning the previously available CHA port 620c to unavailable and thus invalidating the CHA port 620c.

First, the integrated management server 100 continuously monitors the load and state of the CHA ports 620 and stores the latest state of the CHA ports 620 as the port information 140 in the disk device 110.

The integrated management server 100 sequentially checks, by loop processing or the like, entries of the port information 140 kept in the disk device 110, and chooses a copy port. In the case where the used ratio 14004 of the chosen copy port and the used ratio 14004 of the original port of the copy port in the port information 140 are both below the lower threshold 12005 of the threshold information 120, the copy port is deemed as lightly loaded and it is judged that the copy port has to be invalidated (17007).

In the example shown in FIG. 28, the CHA port 620c is a copy port and the original port of this copy port is the CHA port 620a. The integrated management server 100 judges whether or not both of the CHA port 620a and the CHA port 620c are lightly loaded.

The integrated management server 100 next deletes every access path that passes through the copy port 620c to reduce the access path bandwidth (17008). Access paths to be deleted are selected by sequentially checking entries of the port information 140 in the disk device 110 through loop processing and choosing every access path whose CHA port information 14003 designates the copy port to be invalidated.

The integrated management server 100 requests, via the second network 410, the path setting subprogram 680 of the data storage system 600 to delete the chosen access paths. The path setting subprogram 680 of the data storage system 600 deletes the designated access paths.

In the example shown in FIG. 28, access paths that pass through the copy port 620c are the access paths 420d and 420e.

In the path configuration information 130, the HBA port information 13004, the CHA port information 13008, and the logical volume information 13009 are picked up from entries of the access paths 420d and 420e. According to the picked up information, the access path 420d passes through the HBA port 520a, the CHA port 620c, and the logical volume A 630a, and the access path 420e passes through the HBA port 520b, the CHA port 620c, and the logical volume B 630b. The access paths 420d and 420e are determined as access paths to be deleted, and then deletion of the access paths 420d and 420e is carried out.

The path load balancing subprogram 560 in the host computer 500 distributes the load of I/O requests among access paths remaining after deletion of access paths, to thereby maintain QoS of the access path bandwidth.

Then the integrated management server 100 turns the CHA port 620c, which is currently in use under light load, into an unavailable state (17009).

The integrated management server 100 requests, via the second network 410, the key issuing subprogram 360 of the license management server 300 to issue a license key for invalidating the CHA port 620c.

The key issuing subprogram 360 of the license management server 300 reads information of the CHA port 620c, such as the validation start time 32006 and the validation cause 32005, out of the charging information 320 from the disk device 310. Then a charge amount counted from when the CHA port 620c is validated until when the CHA port 620c is invalidated is added to the accumulated charge amount 32007 of the charging information 320. The updated charge amount is stored in the disk device 310.

At this point, the charge amount can be varied depending on the validation cause. For instance, no fee or a discounted fee may be charged when the cause of validation is a failure.

In the first embodiment, charging is based on the length of time the CHA ports 620 are in use. Charging may be based on other measures such as the data amount of I/O requests that are sent through the CHA ports 620.

The integrated management server 100 sends, to the data storage system 600, via the second network 410, the license key for invalidating the CHA port 620c which is issued by the license management server 300. The port setting subprogram 670 of the data storage system 600 invalidates the CHA port 620c. In the example shown in FIG. 28, the CHA port 620c as the copy port is turned unavailable.

In the key issuing processing executed by the key issuing subprogram 360 according to the first embodiment, the charging information 320 is changed and fees are charged only when overload is the validation cause. Alternatively, fees may be charged when a failure in a port is the validation cause as well as when the cause is overload.

Specifically, charge amount information 3300 shown in FIG. 29 is employed. The charge amount information 3300 presented as a modified example includes a validation cause 33001 and a per-unit charge amount 33002, is set by the administrator in advance, and is kept in the disk device 310. The per-unit charge amount 33002 indicates an amount charged hourly for the use of a port.

Irrespective of whether overload or breakdown is judged as the validation cause in the key issuing processing of FIG. 23, the utilization time of the CHA port 620 that is to be invalidated is calculated by subtracting the time at which the CHA port is invalidated (current time) from the validation start time 32006 of this CHA port in the charging information 320. The charge amount information 3300 is searched for an entry whose validation cause 33001 matches the identified validation cause, and the per-unit charge amount 33002 of this entry is multiplied by the obtained utilization time.

The charge amount information 3300, which sets an hourly charge amount in FIG. 29, may set an arbitrary amount charged by the unit of an arbitrary length of time. It is also possible to vary the per-unit charge amount from one CHA port 620 to another.

In this modified example, how much is charged is calculated using different per-unit charge amounts which are set for different validation causes. Thus charging can be varied depending on the port validation cause, namely, the cause of failure.

Information of a payer 33013 may be included in charge amount information 3301 as shown in FIG. 30. In this way, who pays the fee can be changed depending on the validation cause.

In the example shown in FIG. 30, the host administrator pays the fee when the validation cause 33011 is "overload"

whereas the CHA manufacturer pays the fee when breakdown is the validation cause namely, the cause of failure.

In the description given above, the used ratio and state of the CHA ports 620 are gathered through the port state updating processing, and the cause of failure of the CHA ports 620 is identified through the port validation judging processing. Alternatively, the used ratio and state of the HBA ports 520 may be gathered to identify the cause of failure of the HBA ports 520 through the port validation judging processing.

The used ratio and state of the SAN switches 430 may be gathered to identify the cause of failure of the SAN switches 430 through the port validation judging processing. In this case, an unavailable CHA port 620 is validated and turned available when a failure occurs in any one of the CHA ports 620, the HBA ports 520, and the SAN switches 430.

The charge amount or the payer of the fee may be changed depending on in which of the CHA ports 620, the HBA ports 520 and the SAN switches 430 a failure occurs.

To give a specific example, the CHA manufacturer pays the fee when the CHA ports 620 break, the host administrator pays the fee when the CHA ports 620 overload or when the HBA ports 520 overload or break or when the SAN switches 430 overload, and the SAN provider pays the fee when the SAN switches 430 break.

While the present invention has been described in detail and pictorially in the accompanying drawings, the present invention is not limited to such detail but covers various obvious modifications and equivalent arrangements, which fall within the purview of the appended claims.

What is claimed is:

1. A method of managing a plurality of access paths in a computer system,
the computer system comprising: a data storage system including a storage area and a plurality of data storage ports; a host computer coupled to the data storage system; an integrated management server for managing a state of the data storage system and a state of the host computer; and a data storage port license management server for managing data storage port license keys used for making the data storage ports available/unavailable and for generating port usage charges based on usage of the data storage ports, the plurality of access paths being set between the data storage system and the host computer, whereby the host computer can access the storage area,
the method comprising:
requesting the data storage port license management server to issue a data storage port license key for validating one of the data storage ports when the access path is set;
sending the data storage port license key obtained in the requesting, to the data storage system in order to validate an unused data storage port that is currently unavailable among the data storage ports;
receiving a notification of a change in an available/unavailable state of the unused data storage port from the data storage system; and
creating an access path passing through the unused data storage port that has been made available with the data storage port license key upon the notification of the change in the available/unavailable state of the unused data storage port.

2. The method according to claim 1, wherein the requesting operation to issue the data storage port license key includes making a request to issue the data storage port license key in one of: a case where a used ratio of one of the access paths exceeds a preset upper limit, and a case where a failure occurs in the access path.

3. The method according to claim 1, comprising:
requesting the data storage port license management server to issue the data storage port license key for invalidating one of the data storage ports in one of: a case where a used ratio of one of the access paths becomes lower than a preset lower limit, and a case where the access path recovers from a failure;
deleting an access path that passes through data storage port to be invalidated;
sending, to the data storage system, the data storage port license key obtained in the requesting operation, in order to make the data storage port to be invalidated unavailable; and
receiving a notification of the change of the invalidation subject data storage port into an unavailable state from the data storage system.

4. The method according to claim 3, further comprising:
creating an access path bandwidth using the unused data storage port that has been made available with the data storage port license key, upon the notification of a change in the available/unavailable state of the data storage port to be invalidated, in place of the access path creating operation; and
reducing the access path bandwidth that passes through the data storage port to be invalidated, in place of the access path deleting operation.

5. The method according to claim 3, wherein, after issuing a data storage port license key for one of validation and invalidation of one of the data storage ports, the data storage port license management server updates charging information in accordance with how the data storage port that is made available/unavailable with the data storage port license key is used.

6. The method according to claim 5, wherein conditions of updating a charge amount included in the charging information are changed depending on at least one of a cause and a location of an access path failure.

7. The method according to claim 1, wherein each of the access paths includes one of a plurality of data storage ports in a plurality of adapters included in the host computer, one of the plurality of data storage ports in a plurality of adapters included in the data storage system, and one of a plurality of storage areas of the data storage system.

8. The method according to claim 1, comprising:
monitoring the state of the data storage ports of the data storage system with the data storage system; and
sending information about whether the data storage port state obtained through the monitoring operation is normal or not, and information on a load of the data storage port with the data storage system.

9. The method according to claim 1, comprising:
changing the available/unavailable state of the data storage port with the data storage port license key received by the data storage system; and
notifying of the change in the available/unavailable state of the data storage port from the data storage system.

10. A computer system, comprising:
a data storage system including a plurality of data storage ports;
a host computer coupled to the data storage system via a network;
an integrated management server for managing a state of the data storage system and a state of the host computer; and
a data storage port license management server for managing data storage port license keys used for making the data storage ports available/unavailable, and for generating port usage charges based on usage of the data storage ports, wherein the data storage system comprises: a disk drive having a storage area where data is read and written as requested by the host computer; a control device having a processor and a memory connected to the processor; and a network interface having the plurality of data storage ports coupled to the network, the host computer comprises: a processor for executing arithmetic processing; a memory connected to the processor; and a network interface coupled to the network, the integrated management server comprises: a processor for performing arithmetic processing; a memory connected to the processor; and a network interface for communicating with an external device; and the data storage port license management server comprises: a processor for performing arithmetic processing; a memory connected to the processor; and a network interface for communicating with an external device, the data storage system and the host computer have a plurality of access paths formed therebetween to enable the host computer to access the storage area, whereby the host computer can access the storage area, the data storage system further comprises a data storage port setting processing module for changing states of the data storage ports, the integrated management server further comprises: a data storage port validating processing module for making the data storage ports available; and a path validating processing module for executing processing for setting the access paths, the data storage port license management server further comprises a data storage port license key issuing processing module for issuing the data storage port license keys, the data storage port validating processing module requests the data storage port license key issuing processing unit to issue a data storage port license key for validating one of the data storage ports when the access paths are set, the data storage port license key issuing processing module issues a data storage port license key for validating one of the data storage ports upon reception of the request to issue a data storage port license key, the data storage port validating processing module sends the data storage port license key obtained by making the request to the data storage system in order to validate an unused data storage port that is currently unavailable among the data storage ports, the data storage port setting processing module makes the data storage port available with the sent data storage port license key, and notifies the integrated management server of the change of the data storage port into an available state, and the path validating processing module creates an access path that passes through the data storage port that has been made available with the data storage port license key in accordance with the notification of the change in the available/unavailable state of the unused data storage port upon reception of the notification of the change.

11. The computer system according to claim 10,
wherein the integrated management server further comprises a data storage port validation judging processing module for judging whether or not validation of the data storage port is necessary, wherein the data storage port validation judging processing module judges that validation of the data storage port is necessary in one of: a case where a used ratio of the data storage port exceeds a predetermined upper limit, and a case where a failure occurs in the data storage port, and wherein the data storage port validating processing module requests to issue the data storage port license key when validation of the data storage port is judged to be necessary.

12. The computer system according to claim 10,
wherein the integrated management server further comprises:

a data storage port invalidation judging processing module for judging whether or not invalidation of the data storage port is necessary;

a data storage port invalidating processing module for making the data storage ports of the data storage system unavailable; and a path invalidating processing module for executing processing for deleting the access paths, wherein the data storage port invalidation judging processing module judges that invalidation of the data storage port is necessary in: a case where a used ratio of the data storage port is below a preset lower limit, and a case where the data storage port recovers from a failure, wherein the path invalidating processing module requests the data storage port license key issuing processing module to issue a data storage port license key for invalidating the data storage port, wherein the data storage port license key issuing processing module issues a data storage port license key for invalidating the data storage port upon reception of the request for a data storage port license key, wherein the path invalidating processing module deletes an access path that passes through the data storage port to be invalidated, wherein the path invalidating processing module sends the data storage port license key obtained by making the request to the data storage system, in order to make the data storage port to be invalidated unavailable; and wherein the data storage port setting processing module makes the data storage port unavailable with the sent data storage port license key, and notifies the integrated management server of the change of the data storage port into an unavailable state.

13. The computer system according to claim 12,
wherein the path validating processing module creates, instead of the access path, an access path bandwidth using the data storage port that has been made available with the data storage port license key, upon notification of the change in the available/unavailable state of the unused data storage port, and wherein the path invalidating processing module deletes, instead of the access path, the access path bandwidth using the data storage port to be invalidated.

14. The computer system according to claim 12, wherein, after issuing a data storage port license key for one of validation and invalidation of one of the data storage ports, the data storage port license key issuing processing module updates charging information in accordance with how the data storage port that is made available/unavailable with the data storage port license key is used.

15. The computer system according to claim 14, wherein the data storage port license key issuing processing module changes conditions of updating a charge amount included in the charging information, depending on at least one of a cause and a location of an access path failure.

16. The computer system according to claim 12,
wherein the data storage system further includes a data storage port information gathering processing module for gathering information on the data storage ports of the data storage system,
wherein the data storage port information gathering processing module monitors the state of the data storage ports of the data storage system, and sends information obtained by the monitoring to the integrated management server,
wherein the data storage port validation judging processing module judges, from the sent data storage port information, whether the state of the data storage port is normal or not, a magnitude of a load of a data storage port, and whether to make the data storage ports available, and
wherein the data storage port invalidation judging processing module judges whether the data storage port state is normal or not, the magnitude of the load on the data storage port, and whether to make the data storage ports unavailable.

17. The computer system according to claim 10, wherein each of the access paths includes one of the plurality of data storage ports in a plurality of adapters included in the host computer, one of the plurality of data storage ports in a plurality of adapters included in the data storage system, and one of the plurality of storage areas of the data storage system.

* * * * *